US010606271B2

(12) United States Patent
Tillotson et al.

(10) Patent No.: US 10,606,271 B2
(45) Date of Patent: Mar. 31, 2020

(54) MAGNETIC NAVIGATION AND POSITIONING SYSTEM

(71) Applicant: The Boeing Company, Chicago, IL (US)

(72) Inventors: Brian Tillotson, Kent, WA (US); Alyson Bonk, Seattle, WA (US)

(73) Assignee: The Boeing Company, Chicago, IL (US)

( * ) Notice: Subject to any disclaimer, the term of this patent is extended or adjusted under 35 U.S.C. 154(b) by 217 days.

(21) Appl. No.: 15/652,155

(22) Filed: Jul. 17, 2017

(65) Prior Publication Data
US 2019/0018417 A1  Jan. 17, 2019

(51) Int. Cl.
G01C 21/00 (2006.01)
G05D 1/02 (2020.01)
G05D 1/10 (2006.01)
G01C 21/08 (2006.01)
G08G 5/00 (2006.01)

(52) U.S. Cl.
CPC .......... G05D 1/0202 (2013.01); G01C 21/08 (2013.01); G05D 1/104 (2013.01); G05D 1/02 (2013.01); G08G 5/0008 (2013.01)

(58) Field of Classification Search
USPC ................................. 701/469, 470
See application file for complete search history.

(56) References Cited

U.S. PATENT DOCUMENTS

| 3,900,878 A | 8/1975 | Tsao |
| 4,710,708 A | 12/1987 | Rorden et al. |
| 5,576,973 A | 11/1996 | Haddy |
| 6,666,404 B1 * | 12/2003 | Wingert .................. B64C 27/20 244/17.19 |
| 6,686,881 B1 | 2/2004 | Lu et al. |
| 7,543,780 B1 * | 6/2009 | Marshall ............... B64C 39/024 244/194 |
| 7,808,429 B2 | 10/2010 | Curry et al. |
| 7,859,464 B2 | 12/2010 | Smith et al. |
| 7,865,303 B2 | 1/2011 | Weiss et al. |
| 7,876,267 B2 | 1/2011 | Smith et al. |
| 8,054,198 B2 | 11/2011 | Spinelli et al. |
| 8,068,984 B2 | 11/2011 | Smith et al. |
| 8,089,408 B2 | 1/2012 | Smith et al. |
| 8,299,966 B2 | 10/2012 | Smith et al. |
| 8,355,866 B2 | 1/2013 | Smith et al. |
| 8,392,140 B1 | 3/2013 | Bartholet |

(Continued)

FOREIGN PATENT DOCUMENTS

| CA | 2380048 A1 | 2/2001 |
| CN | 1367886 A | 9/2002 |

(Continued)

OTHER PUBLICATIONS

US 9,513,345 B2, 12/2016, Kaup et al. (withdrawn)

Primary Examiner — Masud Ahmed
(74) Attorney, Agent, or Firm — Kolisch Hartwell, P.C.

(57) ABSTRACT

A cooperative system of vehicles is disclosed, each of a first vehicle and a second vehicle having a magnetometer, a filter, a database, a conductive loop, and an AC output generator. The magnetometer is attached to measure a surrounding magnetic field, and the filter to isolate a sensed signal. The AC output generator is connected to the conductive loop to generate a magnetic field.

20 Claims, 16 Drawing Sheets

(56) References Cited

U.S. PATENT DOCUMENTS

| | | |
|---|---|---|
| 8,781,739 B1 | 7/2014 | Miller |
| 8,798,924 B2 | 8/2014 | Haverinen |
| 8,855,671 B1 | 10/2014 | Mirov |
| 9,541,610 B2 | 1/2017 | Kaup et al. |
| 9,551,561 B2 | 1/2017 | Kochanski |
| 9,557,391 B2 | 1/2017 | Egan et al. |
| 2003/0018430 A1 | 1/2003 | Ladetto et al. |
| 2003/0135327 A1* | 7/2003 | Levine ............... G01C 21/165 701/500 |
| 2007/0061076 A1 | 3/2007 | Shulman |
| 2008/0091345 A1 | 4/2008 | Patel et al. |
| 2008/0114533 A1 | 5/2008 | Weiss et al. |
| 2010/0039106 A1* | 2/2010 | Edelstein ............ G01R 33/028 324/253 |
| 2011/0062956 A1* | 3/2011 | Edelstein ........... G01R 33/0286 324/251 |
| 2012/0143495 A1 | 6/2012 | Dantu |
| 2013/0179074 A1 | 7/2013 | Haverinen |
| 2015/0153151 A1 | 6/2015 | Kochanski |
| 2015/0344136 A1* | 12/2015 | Dahlstrom ............ B64C 39/024 701/3 |
| 2016/0216340 A1 | 7/2016 | Egan et al. |
| 2016/0231394 A1 | 8/2016 | Manickam et al. |
| 2016/0245655 A1 | 8/2016 | Ruizenaar |
| 2016/0356863 A1 | 12/2016 | Boesch et al. |
| 2017/0018058 A1 | 1/2017 | Spinelli et al. |
| 2017/0066464 A1* | 3/2017 | Carter ................... G08G 1/207 |
| 2017/0068012 A1 | 3/2017 | Fisk |
| 2017/0097435 A1 | 4/2017 | Hull et al. |

FOREIGN PATENT DOCUMENTS

| | | |
|---|---|---|
| CN | 105717939 A | 6/2016 |
| DE | 102005014299 A1 | 10/2006 |
| KR | 1020110000630 A | 1/2011 |
| WO | 2008082423 A1 | 7/2008 |
| WO | 2016190909 A2 | 12/2016 |

* cited by examiner

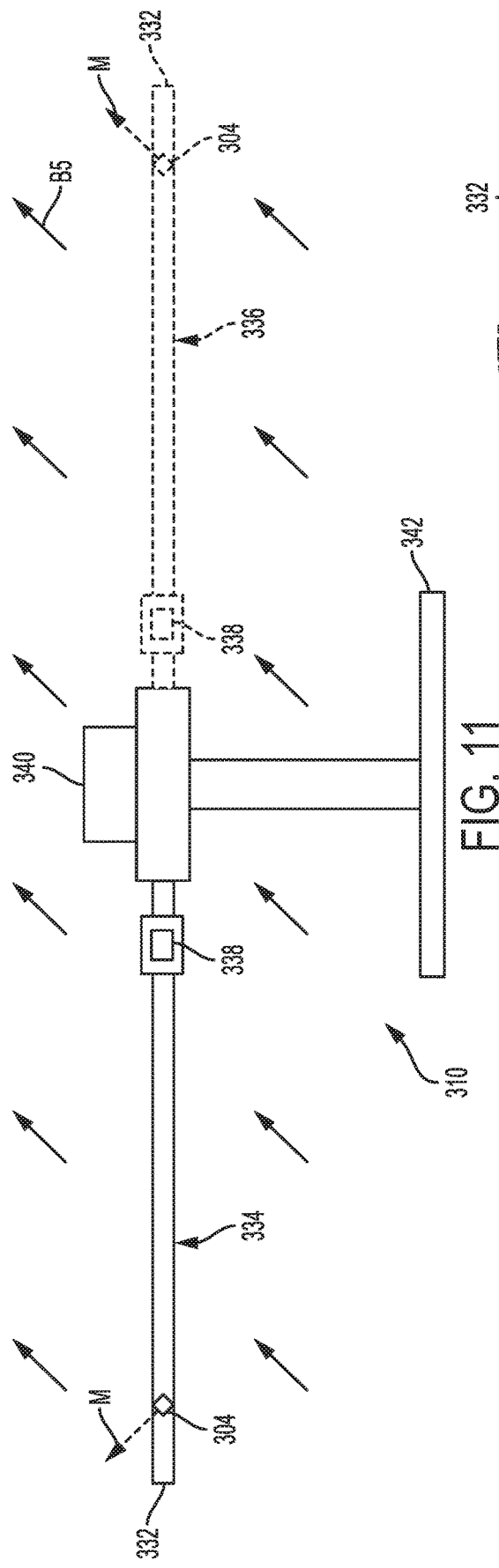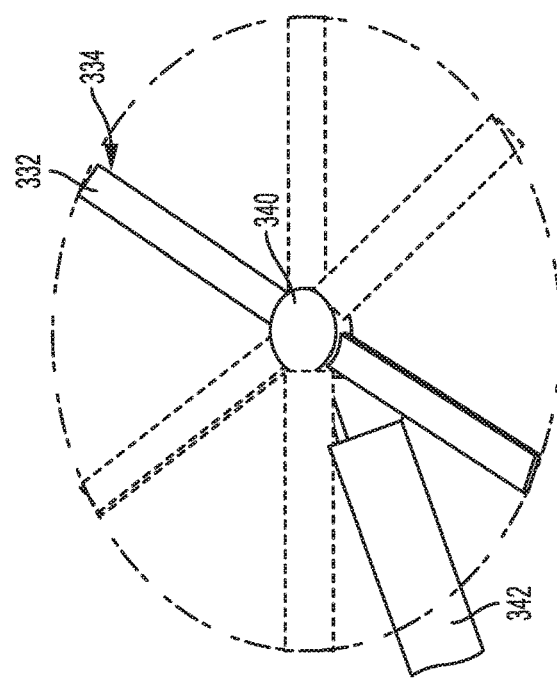

MAGNETIC NAVIGATION AND POSITIONING SYSTEM

FIELD

This disclosure relates to vehicles, systems, and methods that use a magnetometer on a vehicle to navigate. More specifically, the disclosed embodiments relate to vehicles, systems and methods for determining a relative position of a vehicle with reference to another vehicle, or for determining a relative position of a vehicle with reference to a geographic location marked with a powerline. The vehicles, systems and methods may be used with manned and unmanned air vehicles, land vehicles, and sea vehicles, including a single vehicle, a cooperative system of vehicles, or a swarm of vehicles.

INTRODUCTION

Vehicles are commonly enabled with a Global Positioning System (GPS) to locate the vehicle's position. However, it may be necessary or desirable to locate a position of a vehicle using something other than GPS due to system failures, lack of satellites, corrupted or scrambled signals, GPS jamming, GPS spoofing, or other situations where GPS is denied. Vehicles moving in formation are particularly reliant on precise and consistent location of relative positions. More precise navigation is also desirable for low visibility landings. The equipment needed for Cat III landings is expensive and heavy, but inability to accommodate such landings imposes operational costs due to delay or cancellation of flights in adverse weather.

Typical current solutions include celestial navigation, visual navigation, and radar navigation. However, celestial navigation does not work through overcast or forest canopies; visual navigation does not work through undercast, fog, or heavy precipitation; and radar navigation equipment is heavy, has a significant power cost, and cannot be safely used in regions where enemy forces have radio direction-finding equipment. Other possible solutions include Inertial Measurement Units, active sensing systems using Radio Frequency (RF) emitters and a spatial map of the RF environment, and passive camera-based approaches that create a three-dimensional model of the environment. But these methods lack the desired precision and accuracy, and each have further drawbacks.

In all developed regions of the world, electrical systems operating on a changing (e.g. Alternating Current or AC) power produce magnetic fields with alternating polarity. This alternation makes the fields easy to differentiate from the Earth's static (e.g. Direct Current or DC) magnetic field, or other background fields. Powerlines are relatively abundant in urban areas and vehicles pass through magnetic fields of powerlines regularly. In rural areas, powerlines are less common but power is supplied by Single Wire Earth Return (SWER) powerlines that have strong magnetic fields detectable from large distances. Portable AC electromagnets are also commercially available, capable of producing powerful alternating fields using only a vehicle's power source.

SUMMARY

The present disclosure describes a vehicle that can sense AC magnetic fields for use in formation maneuvering. Such a vehicle can sense other magnetic fields such as magnetic fields from powerlines to achieve precision navigation, typically without relying on GPS. The present disclosure describes various systems with one or more of the following components.

A vehicle—typically an air vehicle
A magnetometer on the vehicle.
A filter for detecting and measuring an AC component of the ambient magnetic field measured by the magnetometer.
A conductive loop connected to an AC output generator, to create a magnetic field.
A database of expected measurements at a plurality of relative distances and orientations between the vehicle and the conductive loop.
A computer for matching a sequence of AC magnetic field measurements to a sequence of relative distances and orientations in the database.

In some embodiments, the vehicle may include a geographic information system (GIS) that matches locations to AC magnetic field characteristics, covering a spatial region in which navigation is desired. In some embodiments, the vehicle may also include a computer for matching a sequence of AC magnetic field measurements to a sequence of locations in the GIS.

Features, functions, and advantages may be achieved independently in various embodiments of the present disclosure, or may be combined in yet other embodiments, further details of which can be seen with reference to the following description and drawings.

BRIEF DESCRIPTION OF THE DRAWINGS

FIG. 11 is a side view of two magnetometers mounted on a rotor blade.

FIG. 12 is an isometric view of the rotor blade of FIG. 11, with movement indicated by dashed lines showing the rotor blade in different positions.

DESCRIPTION

Overview

Various embodiments of a magnetic navigation and positioning system having at least one vehicle and a magnetometer are described below and illustrated in the associated drawings. Unless otherwise specified, a positioning system or vehicle and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other positioning systems and vehicles. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Figure 1:
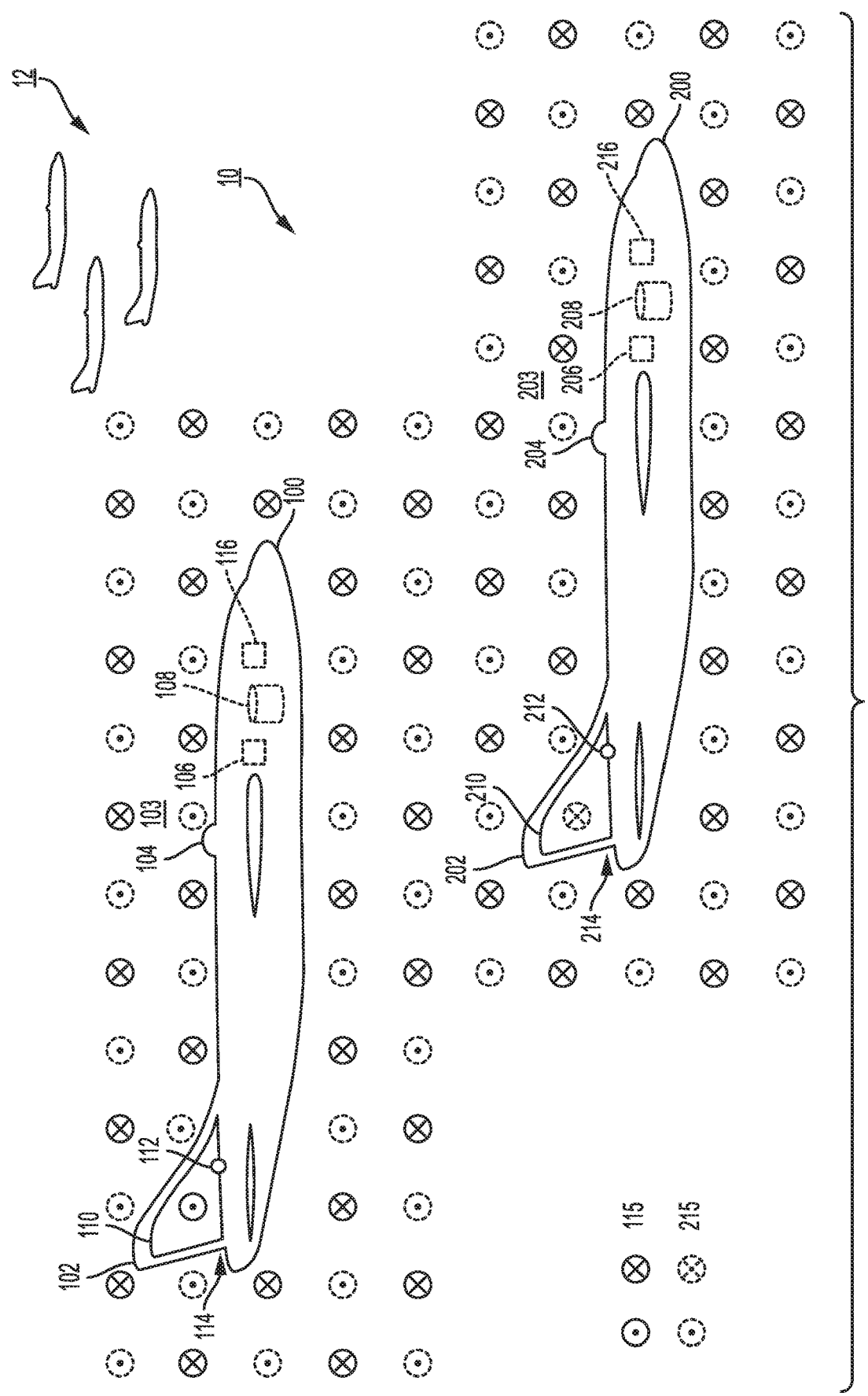
FIG. 1 is a simplified side view of a cooperative system of vehicles, showing two similar air vehicles, each carrying at least one magnet and at least one magnetometer, with schematic representation of a magnetic field surrounding the vehicles.

FIG. 1 shows an embodiment of a cooperative system 10 for formation maneuvering and navigation of vehicles. More specifically, two similar air vehicles are shown, vehicle 100 and vehicle 200, each including elements used in the system 10. The vehicles may be identical, and may form part of a larger group of vehicles known as a swarm and generally indicated at 12.

Air vehicle 100 includes flight surfaces 102, a magnetometer 104, a filter 106, a database 108, a conductive loop 110, and a magnet in the form of an Alternating Current (AC) output generator 112 connected to conductive loop 110. Similar components of air vehicle 200 are labelled with corresponding reference numerals, such as 202, 204, 206, and 208.

Magnetometer 104 is carried by flight surfaces 102 to measure a magnetic field 103, including indicated magnetic fields 115 and 215, surrounding the magnetometer 104. The magnetic field represented by B1 is generated by output generator 112 and conductive loop 110, and the magnetic field represented by 215 is generated by output generator 212 with a frequency 213, and conductive loop 210.

Filter 106, also carried by flight surfaces 102, isolates a sensed signal 107 caused by the magnetic field 215. The sensed signal is stored in database 108 as a listing as a function of time 109. Conductive loop 110 is formed as part of flight surfaces 102, and AC output generator 112 is connected to the conductive loop 110 to generate target magnetic field 115. In the embodiment pictured in FIG. 1, air vehicle 100 is an Unmanned Aerial Vehicle, or UAV. In other examples the vehicle may be a different type of air vehicle, such as a commercial jet, a private light aircraft, or any other type of aerial craft. Other embodiments may include a land vehicle or water vehicle.

Magnetometer 104 is shown mounted on an upper surface of vehicle 100, but may also be placed at a nose of a craft, at a wing-tip, or on a moving rotor such as a propeller. Preferably, magnetometer 104 is mounted at a location on an air vehicle with least exposure to electromagnetic interference from other electrical systems of the vehicle. Air vehicle 100 may be configured to minimize production of AC magnetic fields at or near specific frequencies, and to avoid shielding magnetometer 104 from external magnetic fields.

Any type of magnetometer may be used, as appropriate to the air vehicle and its application. For a small UAV where size, weight, and power are at a premium, magnetoresistive devices may be appropriate. A fluxgate magnetometer, configured with an internal frequency much higher than 60-Hz, may be appropriate for applications requiring moderate size, power, and sensitivity. Magnetometers such as a Superconducting Quantum Interference Device (SQUID) or Spin Exchange Relaxation Free (SERF) magnetometer may provide excellent precision and sensitivity. For example, a SQUID may measure fields as low as 5 aT, or $5 \times 10^{-18}$ Tesla. In other examples a magnetometer may be composed of loops of electrical conductor built into an airframe of the air vehicle and connected to a voltmeter or ammeter. Many other types of magnetometers are known in the art and may be chosen by a skilled person.

Each vehicle 100, 200 includes a navigational reference 114, 214. The navigational reference may include a conductive loop 110 and an AC output generator 112 with an output frequency 113, as shown, or may include any system to generate a magnetic field readable by magnetometers 104, 204. In some examples a conductive coil, or other suitable type of electromagnet may be used in order to generate sufficiently strong magnetic fields.

As shown in FIG. 1, conductive loop 110 generates magnetic field 115 pointing into the plane of the drawing proximate magnetometer 104. AC output generator 212 is out of phase with generator 112, so magnetic field 215 is antiparallel to field 115 and points out of the plane of the drawing proximate magnetometer 104. As AC output generators 112, 212 reverse current in conductive loops 110, 210, magnetic fields 115, 215 also reverse direction. Magnetic fields 115, 215 may be distinguished by this phase difference, so that a signal corresponding to magnetic field 115 may be isolated from readings taken by magnetometer 104. In some examples, AC output generators 112, 212 may have different frequencies 113, 213 to facilitate filtering of readings.

Figure 2:
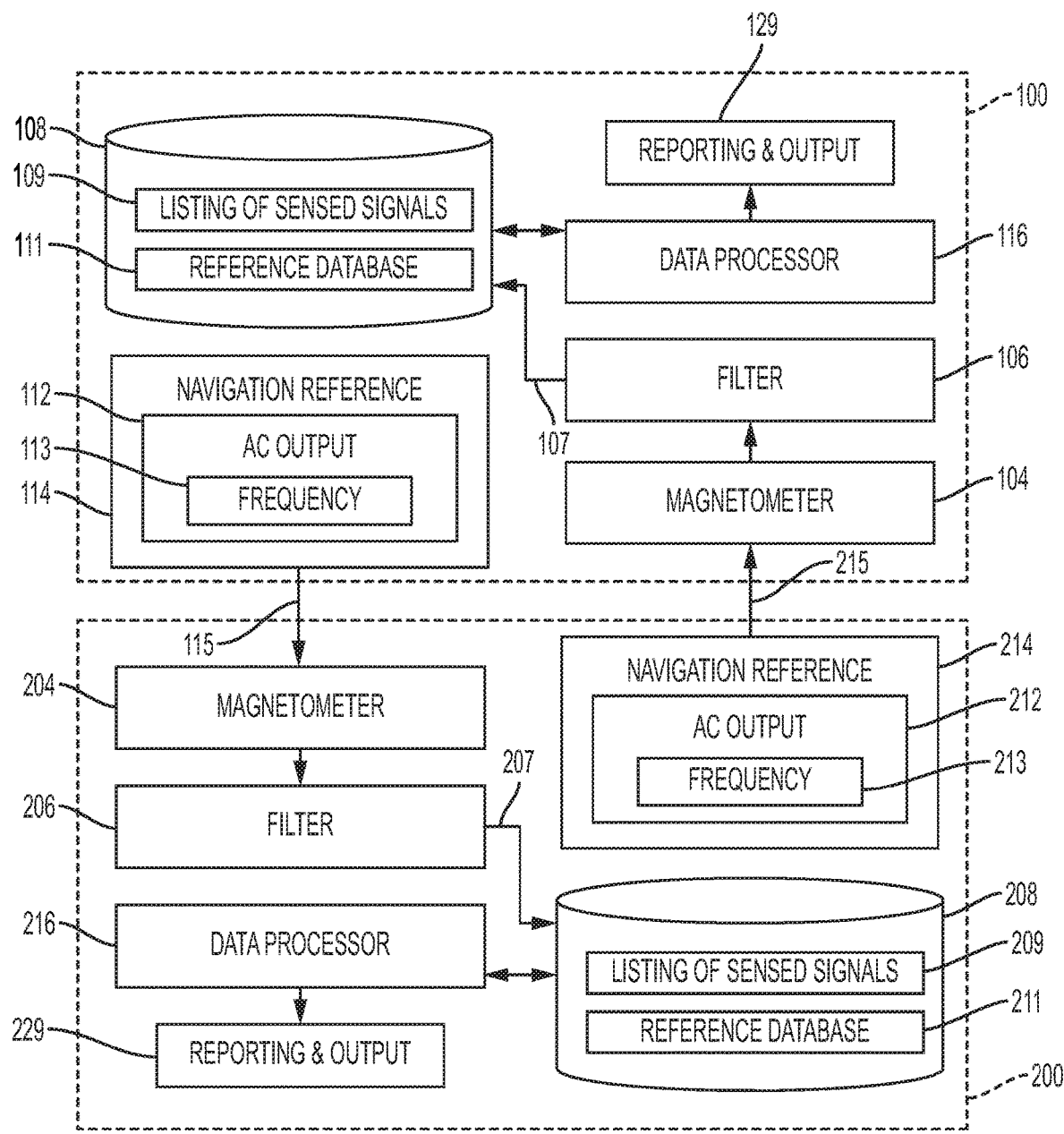
FIG. 2 is a schematic diagram depicting components of the cooperative system of vehicles of FIG. 1.

FIG. 2 is a schematic diagram of cooperative system 10, including components of vehicles 100 and 200. As shown, magnetometer 104 measures a surrounding magnetic field, including magnetic field 215 resulting from navigational reference 214. Measurements are communicated to a filter 106, which isolates some component of the surrounding magnetic field corresponding to magnetic field 215. Filter 106 passes the isolated component to a storage database 108 in communication with a data processor 116. The measurements are stored in database 108 as a function of time.

Database 108 may contain a listing of expected magnetic readings 111 at various locations and orientations of vehicle 100 relative to vehicle 200. Data processor 116 compares the isolated components of measurements by magnetometer 104 to expected magnetic readings 111 using a matching algorithm 117 to determine an estimated relative location of vehicle 100 relative to vehicle 200, corresponding to a best match.

Data processor 116 may compare one or more attributes of the isolated components to determine a best match. For example, processor 116 may compare a frequency, a phase, an orientation, an ellipticity, or a magnitude of the isolated components to listings of expected magnetic readings. Data processor 116 may use matching algorithm 117 to compare an attribute of the isolated components from filter 106 to a listing of expected magnetic readings from database 108. Processor 116 may use a least-squares fit, a Kalman filter, or any other appropriate matching algorithm.

Data processor 116 may output a report 129 of estimated relative location to a human operator, to another system of vehicle 100, or to a remote operator or system, not shown. In some embodiments, data processor 116 may be integrated as part of a comprehensive navigational system, and perform further calculations accordingly.

Similarly, magnetometer 204 of vehicle 200 measures a surrounding magnetic field 203 and communicates magnetic field measurements to a filter 206 to isolate some component (e.g. signal) 207 corresponding to magnetic field 115. The isolated components are stored as a listing (e.g. of sensed signals) 209 in a database 208 as a function of time and compared to a listing of expected magnetic readings (e.g. in a reference database) 211 by a data processor 216 to determine an estimated relative location of vehicle 200 relative to vehicle 100, corresponding to a best match. The result is output as a report 229 to an operator or other system.

The cooperative system 10 of vehicles 100, 200 may be members of a swarm, as mentioned above, containing any desired number of vehicles. Each vehicle may measure a surrounding magnetic field and isolate components of the field corresponding to navigational references of other vehicles to determine an estimated location relative to each other vehicle. Vehicles 100, 200 may be identical, or may be any desired combination of different vehicles. Cooperative system 10 may further include a third or more additional vehicles, each also using a magnetometer and navigational reference to similarly participate in cooperative navigation.

Figure 3:
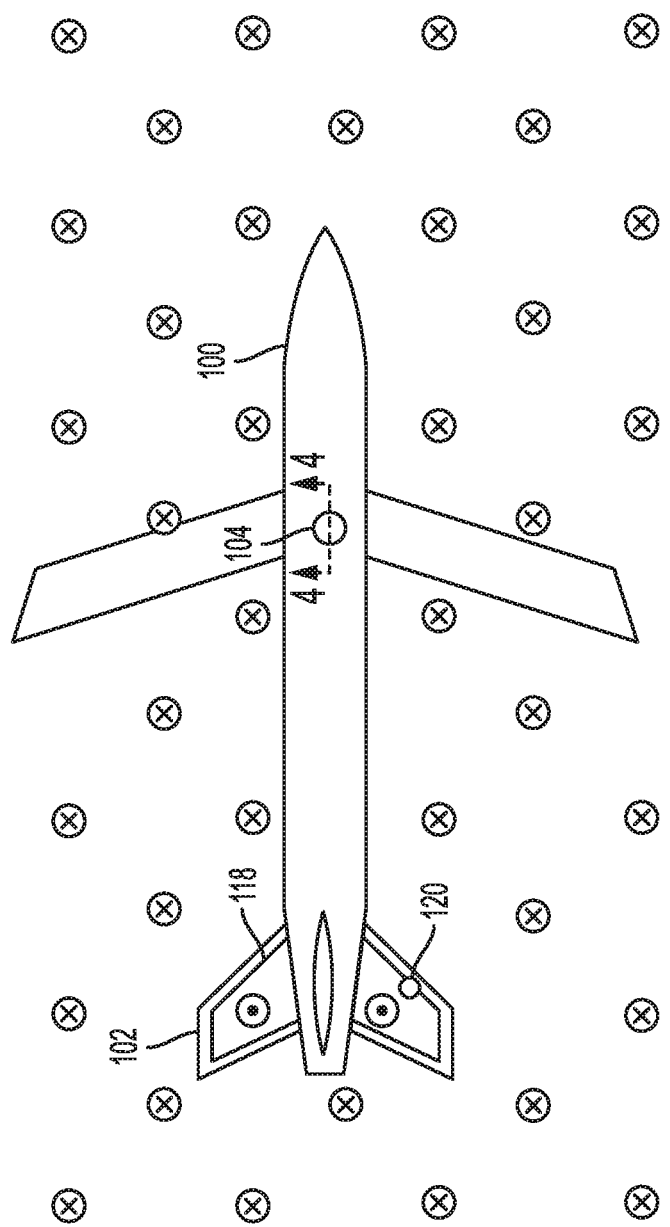
FIG. 3 is a top view of an air vehicle of FIG. 1, with schematic representation of a magnetic field surrounding the vehicle.

FIG. 3 shows a top view of vehicle 100. As shown in the combination of FIG. 1 and FIG. 3, vehicle 100 may have multiple electromagnets or conductive loops to generate magnetic fields having distinguishable ellipticity. For example, a second conductive loop 118 may create a second magnetic field 121 when connected to a second Alternating Current (AC) output generator 120. Preferably, second AC output generator 120 is out of phase with output generator 112, so that the resulting magnetic fields 115, 121 have distinguishable ellipticity. Alternatively or in addition, AC output generator 120 may have a different frequency than output generator 112.

In some embodiments, navigational references 114, 214 may conform to an electrical standard. This may allow use of components already manufactured for industry or infrastructure, reducing cost and design complexity. For example, AC output generator 120 may have a frequency of 16.7-Hz as used by some electric railways. The electrical standard may be chosen to differ from any standard used in an intended geographic area of operation for a cooperative system of vehicles. That is, an AC output generator may have an output frequency selected to be distinguishable from a localized electrical standard prevalent in a particular geographic region. For example, an AC output generator for a cooperative system of vehicles intended for us in the US may have a frequency of 50-Hz. Components for this frequency are readily available as it is standard in much of Europe and Asia, but it is distinguishable from the standard of 60-Hz used for powerlines in the US.

Figure 4:
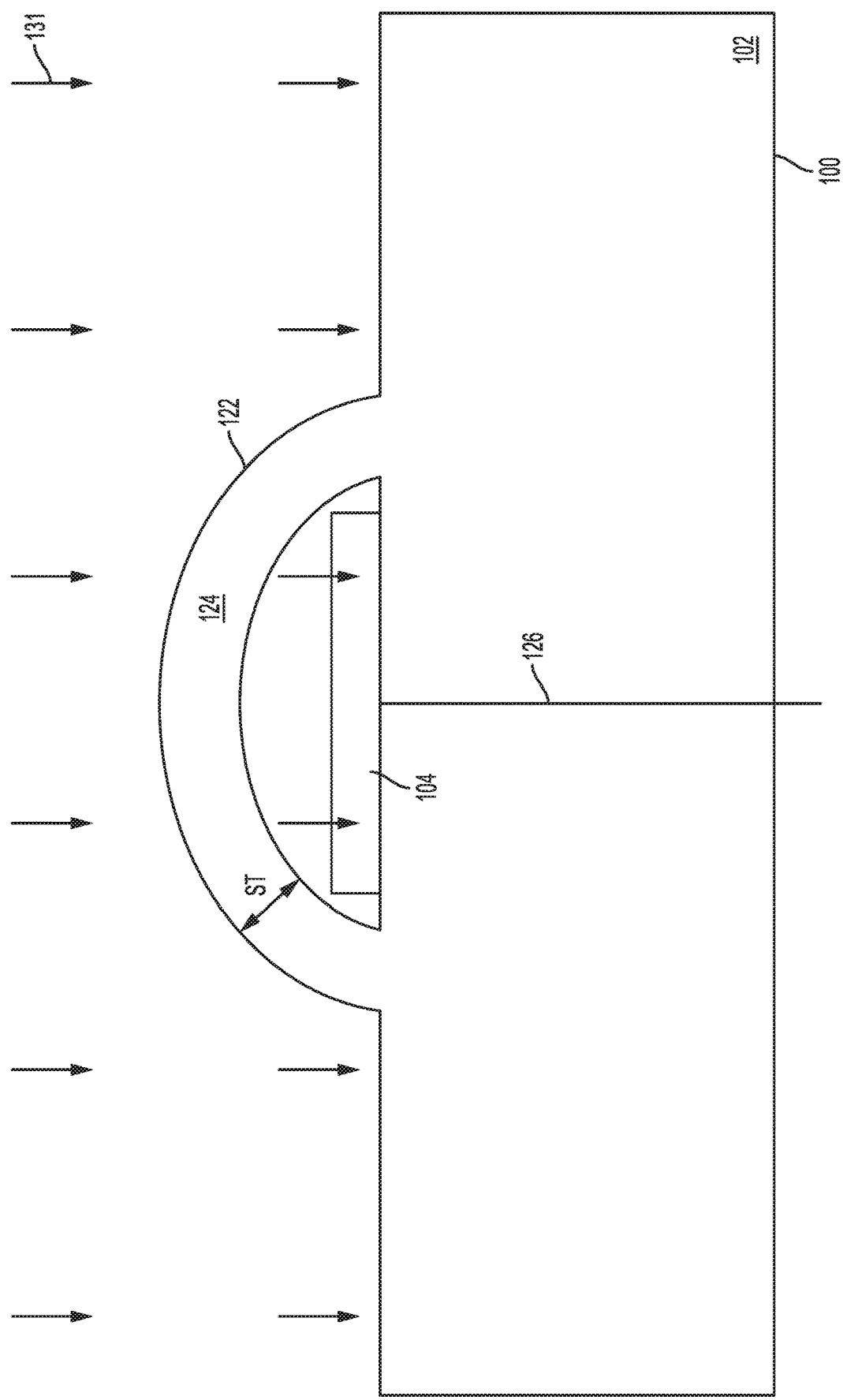
FIG. 4 is a cross-sectional view of a magnetometer of the air vehicle of FIG. 3, taken along line 4-4 of FIG. 3.

FIG. 4 is diagrammatic cross-section of magnetometer 104 mounted on air vehicle 100, taken along line 4-4 in FIG. 3. Magnetometer 104 is mounted in a pod 122 with a skin 124 of a conductive material, for example aluminum or iron. An ambient external magnetic field 131 is indicated. Skin 124 of pod 122 has a thickness indicated by arrow ST. It is believed that magnetometer 104 will be most effective if skin thickness ST is less than half of a calculated skin depth of the conductive material at an AC frequency to be sensed by magnetometer 104.

A calculated skin depth may be calculated by the formula, $$\sigma = \frac{2\rho}{\omega\mu}$$

where $\sigma$ is the 1/e penetration depth of magnetic fields, $\rho$ is resistivity of the material, $\omega$ is angular frequency of the external magnetic field, and $\mu$ is the absolute magnetic permeability of the material.

For example, if external magnetic field 131 is created by a conductor transmitting power at a frequency of 60-Hz, a calculated skin depth for aluminum is approximately 10.9-mm. This results in a maximum recommended skin thickness ST of 5.4-mm of aluminum. For another example, if the same external magnetic field 131 is created by a conductor transmitting power at a frequency of 60-Hz, a calculated skin depth for iron is about 0.3-mm. This results in a maximum recommended skin thickness ST of 0.14-mm of iron.

In other embodiments, a pod may be formed from a non-conductive, non-ferromagnetic skin material. In the embodiment of FIGS. 1-5, pod 122 is domed and extends outwardly from a flight surface. However, in other embodiments, a pod may be square or any other appropriate shape and may be flush with or even indented from a flight surface. A wire 126 is shown in FIG. 4, connecting magnetometer 104 through flight surface 102. Wire 126 may be attached to filter 106 (not shown). Magnetometer 104 may also be connected to filter 106 through wireless communications.

Magnetometer 104 may be a scalar or a vector magnetometer. That is, the magnetometer may measure total strength of a field, may measure field strength in a particular direction, or may measure strength and direction of the field. In FIG. 4, magnetometer 104 is shown mounted generally parallel to an axis of the air vehicle. In other examples, a vector magnetometer may be mounted at an angle relative to an axis of the air vehicle that is most useful for analyzing the measurements of the magnetometer.

While the present disclosure has exciting possibilities for formation maneuvering and swarm control of UAVs, operation of the disclosed systems is more easily understood by first considering use of vehicle 100 for navigation relative to a powerline at a fixed location on the earth. For example, external field 131 surrounding magnetometer 104 may result from transmission of AC power over a powerline P1 located nearby air vehicle 100, as shown in FIG. 5.

Figure 5:
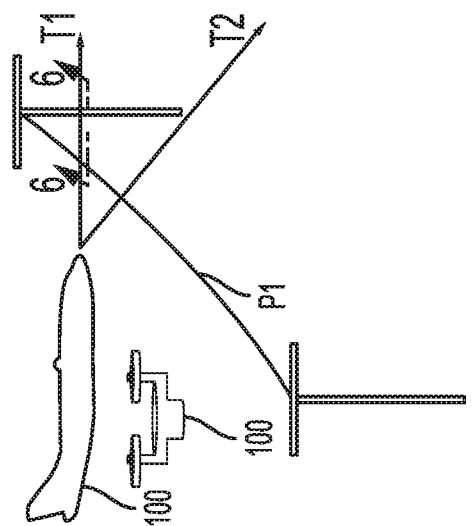
FIG. 5 is an aerial view of an air vehicle from FIG. 1, and a different type of air vehicle, travelling over a power-transmitting powerline using formation maneuvering.

A cooperative pair 12 of vehicle 100 and vehicle 300 is shown in FIG. 5, flying near powerline P1. Two possible trajectories T1 and T2 are indicated by arrows T1 and T2, relative to vehicle 100. When powerline P1 transmits AC power, powerline P1 produces an AC magnetic field. This powerline magnetic field may be sensed by magnetometer 104 in vehicle 100, and a sensed powerline signal may be isolated by filter 106, as discussed above for magnetic field 215. A listing of sensed powerline signals measured by magnetometer 104, isolated by filter 106, and stored in database 108, may correspond to an AC powerline. A powerline such as powerline P1 may thereby be used as a landmark to calculate a position of air vehicle 100 relative to powerline P1, as further described below.

Assuming that powerline P1 is a Single Wire Earth Return powerline, P1 can be modeled as a single wire of infinite length. That is, when a distance from a wire is much smaller than a length of the wire, then magnetic field strength surrounding that wire is inversely proportional to a distance from that wire. At times of low power demand, typical current in a rural SWER powerline is about 50 amps. At a distance of 100 meters, which may be suitable for delivery drones flying through urban areas, the magnetic field intensity generated by transmitting 50-amps through a SWER powerline is approximately $10^{-7}$ Tesla. Such a level of magnetic field intensity would be detectable by small, low-cost magneto-resistive sensors.

Magnetic field intensity remains relatively strong and easy to detect at larger distances from a SWER powerline. At a distance of 1700 meters (more than a mile), the magnetic field intensity generated by transmitting 50-amps through a SWER powerline is approximately $5.81 \times 10^{-9}$ Tesla. This is still within the detection and measurement capability of commercially available magnetometers.

Powerlines may also be found using two wires with a single phase, a first wire to carry current out to a load and a second wire to return current to the power station. Where a distance to the powerline is of the same order as a distance between the first wire and the second wire, field intensity is roughly inversely proportional to distance from the powerline. Where distance to the powerline is much greater that the distance between the two wires, field intensity is inversely proportional to a square of a distance to the powerline.

Single phase two wire powerlines are typically used for power distribution or transmission, and so single phase two wire powerlines often carry higher current than SWER. With a typical current of 500 amps during periods of low demand, the magnetic intensity at a distance of 1000-meters is $2.51 \times 10^{-9}$ Tesla, which is within the detection and measurement capability of commercially available magnetometers.

Figure 6B:
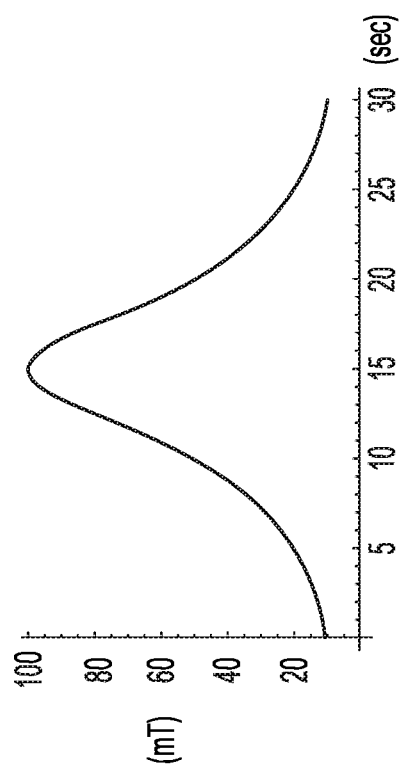
FIG. 6B shows a vertical component of the magnetic field along trajectory T1 of FIG. 6A.
Figure 6C:
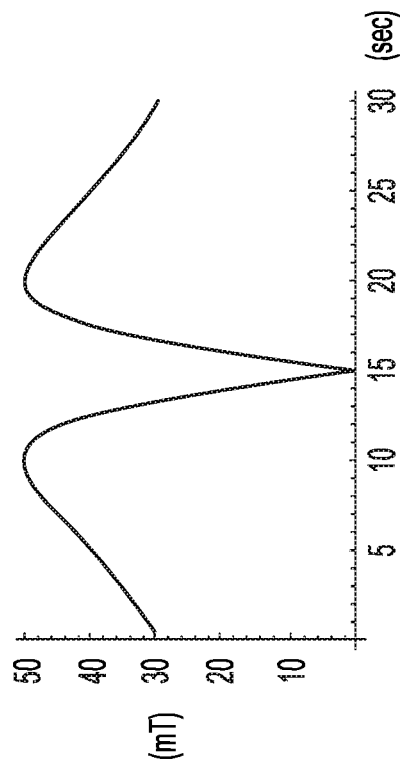
FIG. 6C shows a horizontal component of the magnetic field along trajectory T1 of FIG. 6A.
Figure 6A:
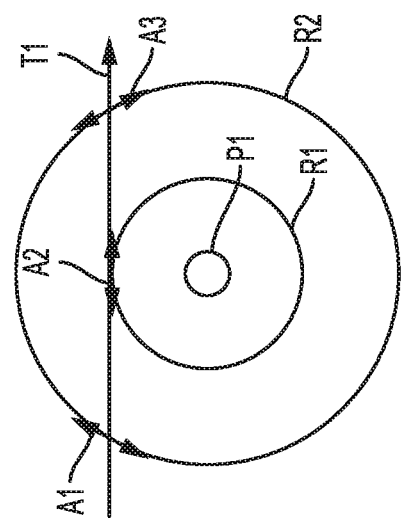
FIG. 6A is a cross-sectional representation of a magnetic field surrounding the power-transmitting powerline of FIG. 2, taken along line 6-6 of FIG. 5.

FIG. 6A shows a cross section of powerline P1 and resulting magnetic field represented by radius R1 and R2. Arrow T1 indicates a trajectory traveled by air vehicle 100 through magnetic field R1 R2, over powerline P1. By modeling powerline P1 as a cylindrical conductor of infinite length, the direction of the magnetic field vector $\vec{B}$ at any point (x, y, z) is perpendicular to the conductor and to the radius vector $\vec{r}$ from the conductor to the point (x, y, z). That is, $\vec{B}$ is tangential to a cylinder of radius R1 or R2 centered on the conductor P1, as shown in FIG. 6A.

When current reverses, as it does 60 times per second for AC power in the US, the direction of the magnetic field also reverses. However, the field direction remains parallel or antiparallel. This is similar to the electric field vector of polarized light, which changes magnitude and sign, but remains aligned with a fixed bidirectional axis. The angular orientation of a bidirectional magnetic axis may be referred to as "AC magnetic polarization angle". In FIG. 6A, Arrows A1, A2, A3 indicate magnetic polarization angles as sensed along trajectory T1.

As represented in FIG. 6A, air vehicle 100 travels from a first point A1,T1 to a second point A2,T1, and then to a third point A3,T1, along horizontal trajectory T1. For example, assume that air vehicle 100 starts at approximately 100-meters above powerline P1 and the first point is at a distance of 250-meters from powerline P1. Assume that P1 is a SWER powerline carrying 50-Amps, for example. Also assume that air vehicle 100 is travelling at approximately 20-meters-per-second. These assumptions mean that air vehicle 100 will travel from the first point at a distance of 250-meters to the second, closest point at 100-meters, and then to the third point at a distance of 250-meters in approximately 30-seconds.

FIG. 6B and FIG. 6C graph intensity of the magnetic field resulting from powerline P1 in millitesla (mT), as measured by magnetometer 104, as air vehicle 100 travels along trajectory T1.

FIG. 6B shows the vertical component of the sensed signal as a function of time, which is preferably stored in database 108 as a listing of multiple sensed variables. As shown, the intensity peaks at about 50 mT at 10-seconds and 20-seconds, or as air vehicle 100 approaches and then passes over powerline P1. At 15-seconds, when air vehicle 100 is overhead powerline P1, the vertical component vanishes. In contrast, the horizontal component shown in FIG. 6C reaches a maximum of about 100 mT when air vehicle 100 is overhead powerline P1.

An operator of air vehicle 100 examining a listing of signals sensed by magnetometer 104 over the period of time shown, could thereby determine that the air vehicle passed directly over powerline P1 at 15-seconds. In a case where the location of powerline P1 is known by the operator, the powerline may therefore be used as a landmark to determine the position of air vehicle 100.

Figure 7A:
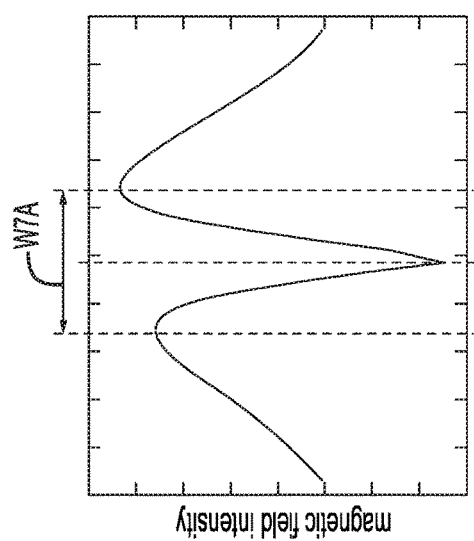
FIG. 7A shows a vertical component of a magnetic field resulting from the powerline, along trajectory T2 of FIG. 5.
Figure 7B:
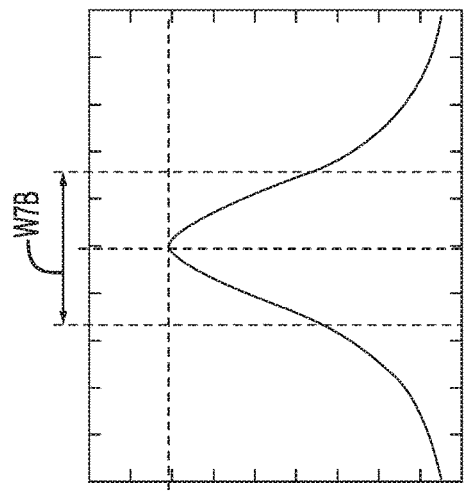
FIG. 7B shows a horizontal component of the magnetic field, along trajectory T2 of FIG. 5.
Figure 8A:
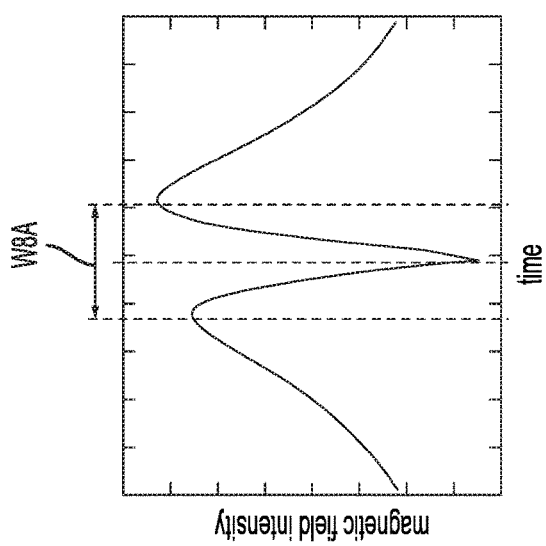
FIG. 8A shows a vertical component of a magnetic field resulting from the powerline, along trajectory T1 of FIG. 5.
Figure 8B:
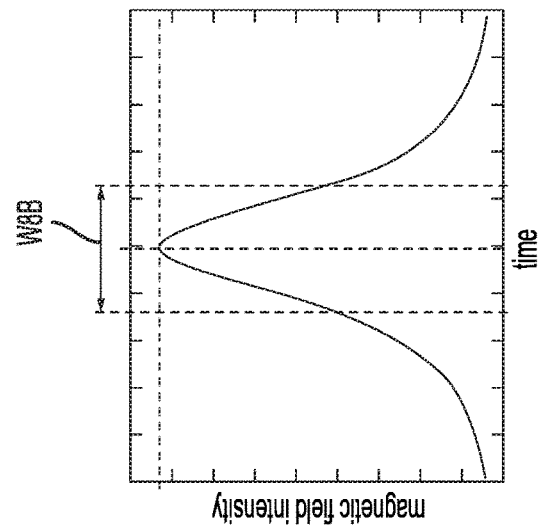
FIG. 8B shows a horizontal component of the magnetic field, along trajectory T1 of FIG. 5.

FIG. 5 shows two possible flight trajectories T1, T2 for vehicle 100, over powerline P1. Both trajectories T1 and T2 represent the same altitude and speed, but along different relative headings. Flight trajectory T1 crosses perpendicular to powerline P1, while flight trajectory T2 crosses at an angle of approximately 60-degrees to powerline P1. FIGS. 7A and 7B show the vertical and horizontal components respectively of the magnetic field measured by vehicle 100 along angled trajectory T2. FIGS. 8A and 8B show the vertical and horizontal components respectively of the magnetic field measured by air vehicle 100 along perpendicular trajectory T1. It should be noted that FIGS. 7A-8B are intended only to illustrate relative differences, and are not calculated for specific unit quantities.

An operator of vehicle 100 may have intended vehicle 100 to travel along trajectory T1, but incorrectly directed vehicle 100 along trajectory T2. When reviewing data recorded in database 108 of vehicle 100, the operator may compare the measured field intensities as shown in FIG. 7A and FIG. 7B to expected measurements, such as the measurements graphed in FIGS. 8A and 8B.

For example, Width W7A between maximum readings in FIG. 7A is broader than the expected width W8A in FIG. 8A.

That is, the time between maximum readings of the vertical component is longer than expected. Width W7B between half-peak values of the horizontal component in FIG. 7B is broader that the expected width W8B in FIG. 8B. That is, the intensity of the horizontal component increases and dies off more slowly than expected. Also, the maximum reading in FIG. 7B is less than that expected in FIG. 8B. An operator with knowledge of the mathematical relationship between such anomalies and errors in heading may therefore be able to determine an angular difference between the intended heading and actual heading.

Figure 9:
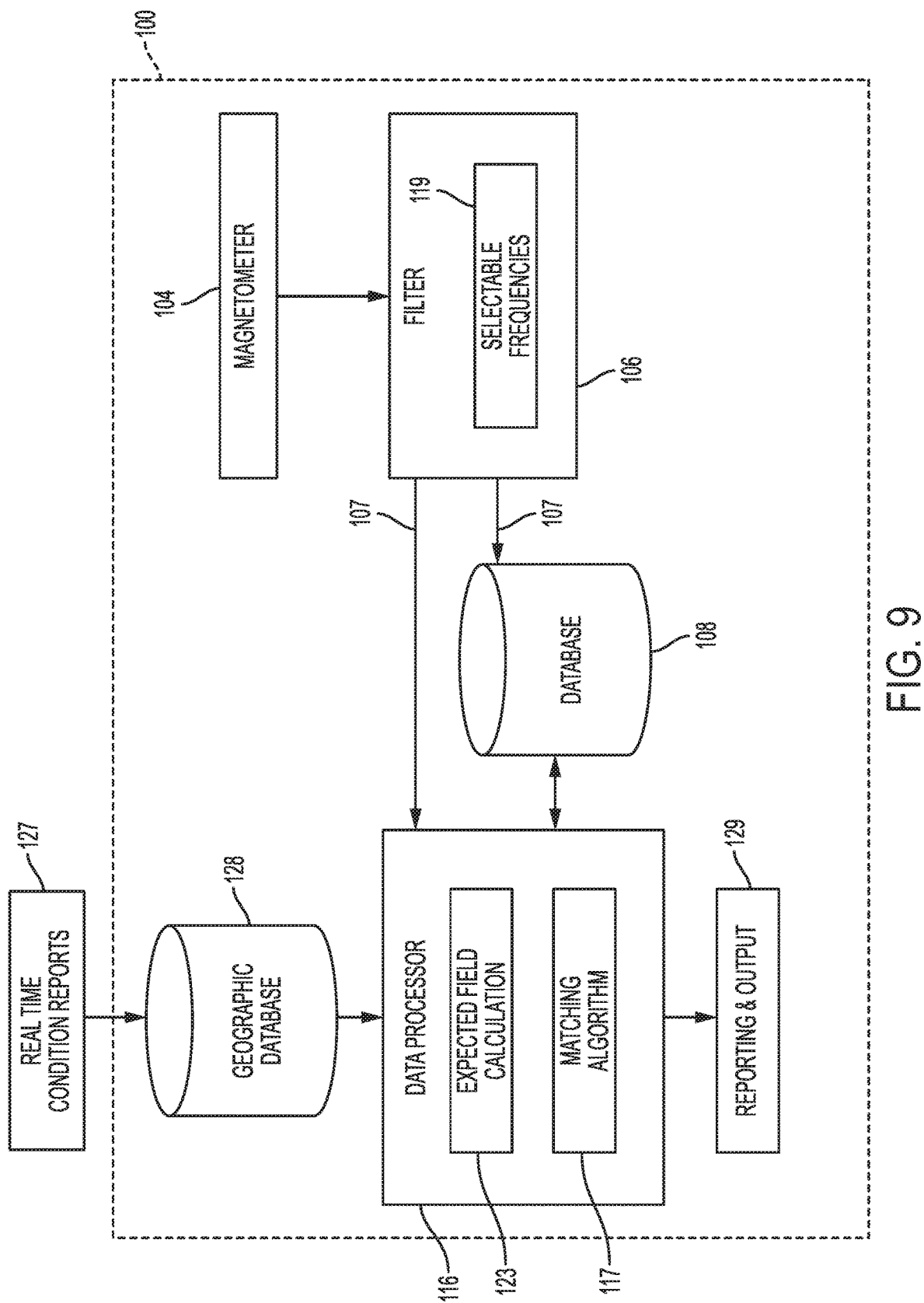
FIG. 9 is a schematic diagram depicting components of another example of an air vehicle.

Such comparison and navigational assessment may also be performed by processor 116 operatively connected to database 108 and the filter 106. FIG. 9 is a schematic diagram depicting components of an example of an air vehicle 100 including such a processor 116.

As in the previous example a magnetometer 104 measures an ambient magnetic field surrounding the magnetometer. Measurements are communicated to a filter 106, which isolates an AC component of the ambient field and may have selectable frequencies 119. Filter 106 may be analog or digital. For example, the filter may include a band-pass filter composed of a tuned LC circuit, or the filter may include an analog to digital converter providing the readings to a processor that performs a Fourier analysis.

The filter frequency may be selectable by an operator of air vehicle 100, either during operation of the air vehicle or during routine ground maintenance of the vehicle. The filter bandwidth may be narrow to reduce noise in the magnetometer readings and thereby improve sensitivity for measuring characteristics of a sensed AC signal. In some examples, the filter bandwidth may also be selectable by an operator. The filter bandwidth may be selected to match a range of frequency errors allowed by local utilities. For example, in the United States the bandwidth may be selected as 0.02-Hz, whereas in Europe the bandwidth may be selected as 0.01-Hz.

One or more additional filters may be connected to the magnetometer. Any suitable filter may be used for the filter, or the additional filter. An additional filter may be configured to isolate a DC component of the ambient magnetic field corresponding to the Earth's magnetic field. Magnetometer 104 may thereby also be used as part of a compass system, to orient the vehicle relative to the Earth's magnetic field as well as relative to powerlines.

In many cases air vehicle 100 includes multiple systems using AC power that contribute AC components to the ambient magnetic field when operating. A system of this type may generate a magnetic field with a frequency corresponding to its power system. Filter 106 may be configured to exclude the power system frequency when isolating signals from the readings of magnetometer 104. Conversely, a power system may be selected for systems of air vehicle 100 that has a frequency different from any frequency of interest. For example, a vehicle intended for use in the in the United States, where powerlines have a frequency of 60-Hz, may be designed to operate on power according to a European standard of 50-Hz.

As shown in FIG. 9, filter 106 passes isolated signals 107 to a storage database 108 and a data processor 116. The signals are stored in database 108 as a listing as a function of time. Processor 116 is also connected to database 108, so that calculations may be performed either on current readings or on a set of readings over time. Any function performed by processor 116 may include a set of instructions stored in database 108, or on any other suitable readable memory storage. In some examples, filter 106 may include a set of instructions performed by processor 116.

In the example pictured in FIG. 9, a geographic database, or Geographic Information System (GIS) 128 is connected to data processor 116. The GIS includes information on powerlines in a selected geographic region. The geographic region may be selected to match an expected area of travel of air vehicle 100. GIS 128 may be updated to include information for additional geographic regions, either during operation of air vehicle 100, during routine maintenance, or in preparation for a flight.

Figure 10:
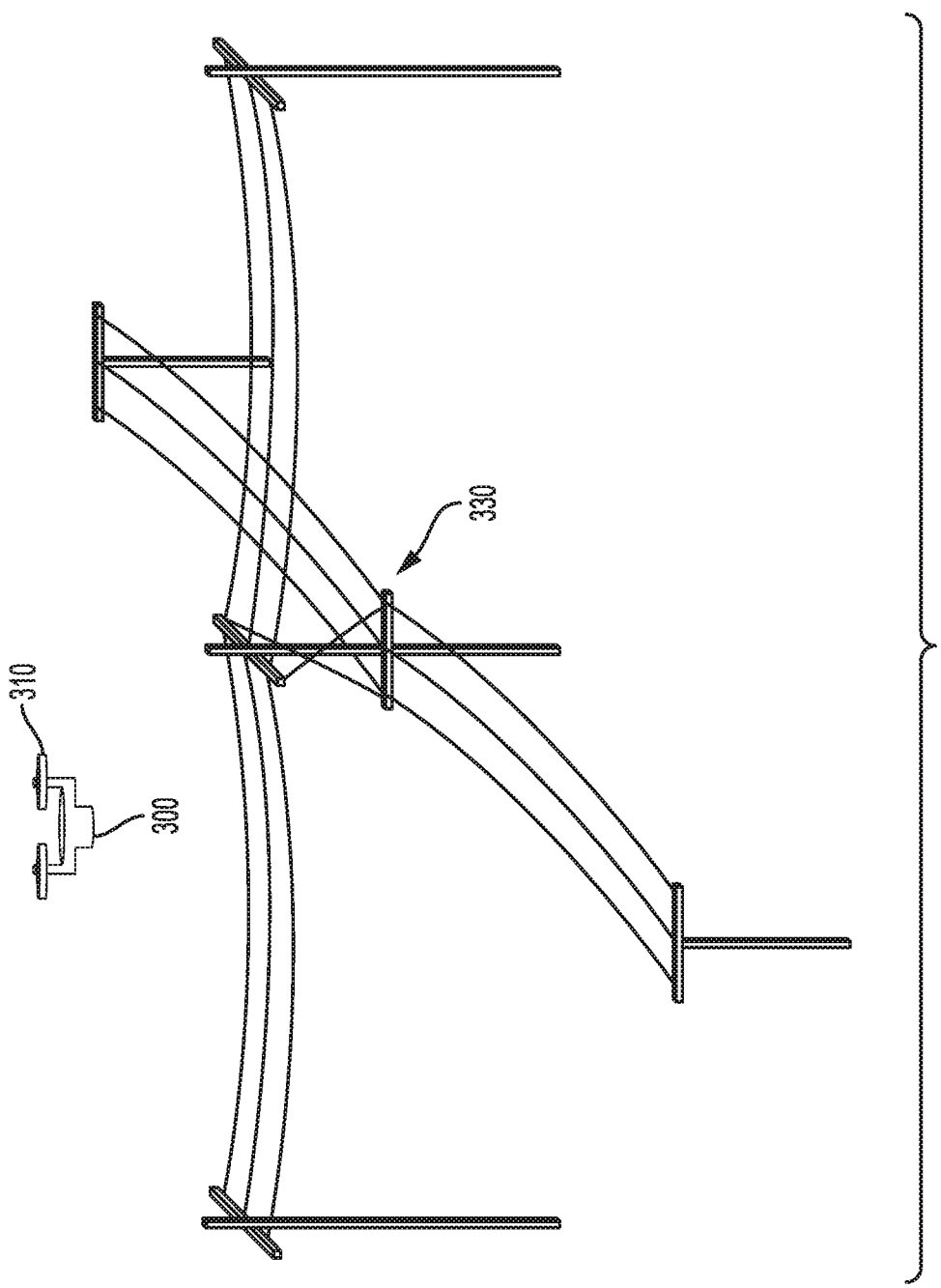
FIG. 10 is an aerial view of an air vehicle travelling over a powerline junction.

The information on powerlines of GIS 128 may include height of powerlines, type of power (SWER, two-phase, three phase, etc.), frequency, voltage, path, location of junctions or substations, or any other related information. For example, as shown in FIG. 10, vehicle 300 may pass over a powerline junction 330 which produces a significantly more complex magnetic field than an isolated SWER line. Such complexity may be more sensitive to relative position. Information on the magnetic field and geographic location of powerline junction 330 stored in GIS 128 may therefore allow precise estimates of location for vehicle 100.

Referring again to FIG. 9, GIS 128 may also include expected Amperage of powerlines, based on typical usage or historical data. Some power systems are equipped to report actual current in a powerline, for example some utility companies use a Supervisory Control and Data Acquisition (SCADA) system to access data on power usage. GIS 128 may be configured to interface with one or more SCADA systems to receive periodic or continual updates of real time conditions 127 (e.g. real time condition reports) such as actual currents. GIS 128 may also be configured to receive updates through connection with other information systems, by connection with a network server, or by any other suitable means. Knowing the actual current at the time of measurement enables processor 116 to more accurately estimate the magnitude of magnetic fields at various locations near the powerline.

In some examples GIS 128 may also include expected magnetic field readings for the geographic region. The expected readings may be found by previous measurement at locations in the region, or by calculations using a mathematical model and powerline locations, or some combination thereof. In the embodiment pictured in FIG. 9, processor 116 uses powerline data provided by GIS 128 to perform a calculation of expected magnetic field readings 123. Processor 116 then uses a matching algorithm to compare the isolated signals from filter 106 or database 108 to the expected magnetic field readings for locations in GIS 128. Processor 116 may use a least-squares fit, a Kalman filter, or any other appropriate matching algorithm.

Processor 116 may compare signals from filter 106 to expected magnetic field readings for all locations in the geographic region of GIS 128. The processor may then output an estimated location corresponding to the best match.

Processor 116 may also store estimated locations in database 108, to more efficiently determine a match. For example, processor 116 may compare signals from filter 106 to expected readings for locations within a selected distance from the last estimated location. The selection may be determined by the distance covered at a maximum speed of air vehicle 100 within a time since magnetometer 104 took readings corresponding to the last estimated location. Any other appropriate calculations or algorithms may be used to improve the efficiency of location estimation by processor 116.

Processor 116 and GIS 128 may be integrated with a navigational system of air vehicle 100. For example, processor 116 may be passed data on a projected flight path for the air vehicle, to calculate an expected set of readings for the projected flight path. Processor 116 may also output estimated locations to the navigational system for display with other navigational information, or for use in further calculations.

Location estimates from processor 116 may be reported or output in any suitable manner. This may include a human readable position display, other processes carried out by processor 116, storage in database 108 or other readable storage media, or communication to a remote operator or another air vehicle.

Vehicle 300 shown in FIGS. 5 and 10 operates by use of two rotors 310, in contrast to the fixed wing design of vehicle 100 in FIGS. 1,3,5. As shown in FIG. 11, rotor 310 allows a magnetometer 304 to be mounted in such a way as to provide additional functionality. Magnetometer 304 is embedded in a blade 332 of rotor 310, proximate a distal end of the blade. Vehicle 300 further includes a filter, a database, and a processor, not shown but similar to the elements discussed above.

As previously described, magnetometer 304 of vehicle 300 measures a surrounding magnetic field B5 and communicates magnetic field measurements to the filter to be analyzed by the data processor. However, even when vehicle 300 is stationary and magnetic field B5 undergoes no changes other than polarity reversal, relative position of magnetometer 304 in magnetic field B5 changes as rotor blade 332 rotates. Magnetometer 304 may therefore measure magnetic characteristics at multiple locations in each revolution.

Vehicle 300 further includes a position sensor 338 to provide information to the processor on the progress of rotor blade 332 through a revolution, or a rotor position relative to the vehicle. The processor may associate a position of rotor blade 332 to each reading of magnetometer 304. In other words, the processor may use the filter and position sensor 338 to isolate a sensed signal in multiple rotor positions. In other embodiments, no sensor may be included and instead a position of rotor blade 332 may be calculated by the processor or other system of vehicle 300.

The processor of vehicle 300 may combine magnetic field measurements and associated positions to form a measurement of a gradient in magnetic intensity and a gradient in magnetic polarization. Magnetometer 304 may thereby act as a AC magnetic gradiometer and an AC polarization gradiometer when rotor 310 undergoes rotation. A single magnetometer may act as a magnetic gradiometer, and may be used to greatly refine the estimated distance from a powerline or other magnetic source. In some examples vehicle 300 may include a first magnetometer and a second magnetometer mounted distal from the first magnetometer, such that the two magnetometers may act as a magnetic gradiometer to provide similar advantages.

In the embodiment shown in FIG. 11, magnetometer 304 is a single axis magnetometer. That is, a magnetometer capable of measuring only one dimension of a three-dimensional magnetic field. The magnetometer is mounted at an angle of 45-degrees relative to a longitudinal extent of rotor blade 332. In this configuration, rotation of rotor blade 332 allows the single axis magnetometer to act as a three-axis device, as discussed further below.

Rotor blade 332 is shown in a first position 334 and a second position 336, within a single revolution. In the pictured example, magnetic field B5 is perpendicular to a vector $\vec{M}$ defined by magnetometer 304 when blade 332 is in position 334 and parallel to $\vec{M}$ when the blade is in position 336. Assuming magnetic field B5 is $\vec{B}$ at magnetometer 304, the intensity measured in positions 334 and 336 may be calculated as $$\vec{M}\cdot\vec{B}=0 \text{ and } \vec{M}\cdot\vec{B}=|B|.$$

Whereas in a case where magnetometer 304 is mounted defining a vector $\vec{M}_p$ parallel to the extent of blade 332, the intensity measured in positions 334 and 336 would be calculated as $$\vec{M}_p\cdot\vec{B}=B_x \text{ and } \vec{M}_p\cdot\vec{B}=-B_x,$$

where the extent of blade 332 defines the x-axis. Mounting magnetometer 304 at an angle from the x-axis that is different from 0-degrees or 90-degrees allows measurements of intensity along all three axes, over the course of a revolution. When mounted at 45-degrees, Magnetometer 304 sweeps a cone that comes within 45-degrees of any polarization and give good sensitivity to an AC field with any orientation. That is, the magnetometer may act as a three-axis magnetometer and measure three-dimensional magnetic vectors.

FIG. 12 shows rotor 310 from above, including hub 340 and support strut 342. Magnetometer 304 may be wired along rotor blade 332 to rotation hub 340, but rotation of the hub precludes connection by wire through to support strut 342 and the remainder of vehicle 300. In some examples magnetometer 304 may be powered by a piezoelectric element mounted on rotor blade 332 and configured to capture vibrational or rotational energy of rotor 310. In other examples, power from vehicle 300 may be passed to magnetometer 304 via an inductive coupling of components of hub 340 and strut 342. Any effective methods of powering magnetometer 304, or returning measurements to the processor may be used.

Figure 13:
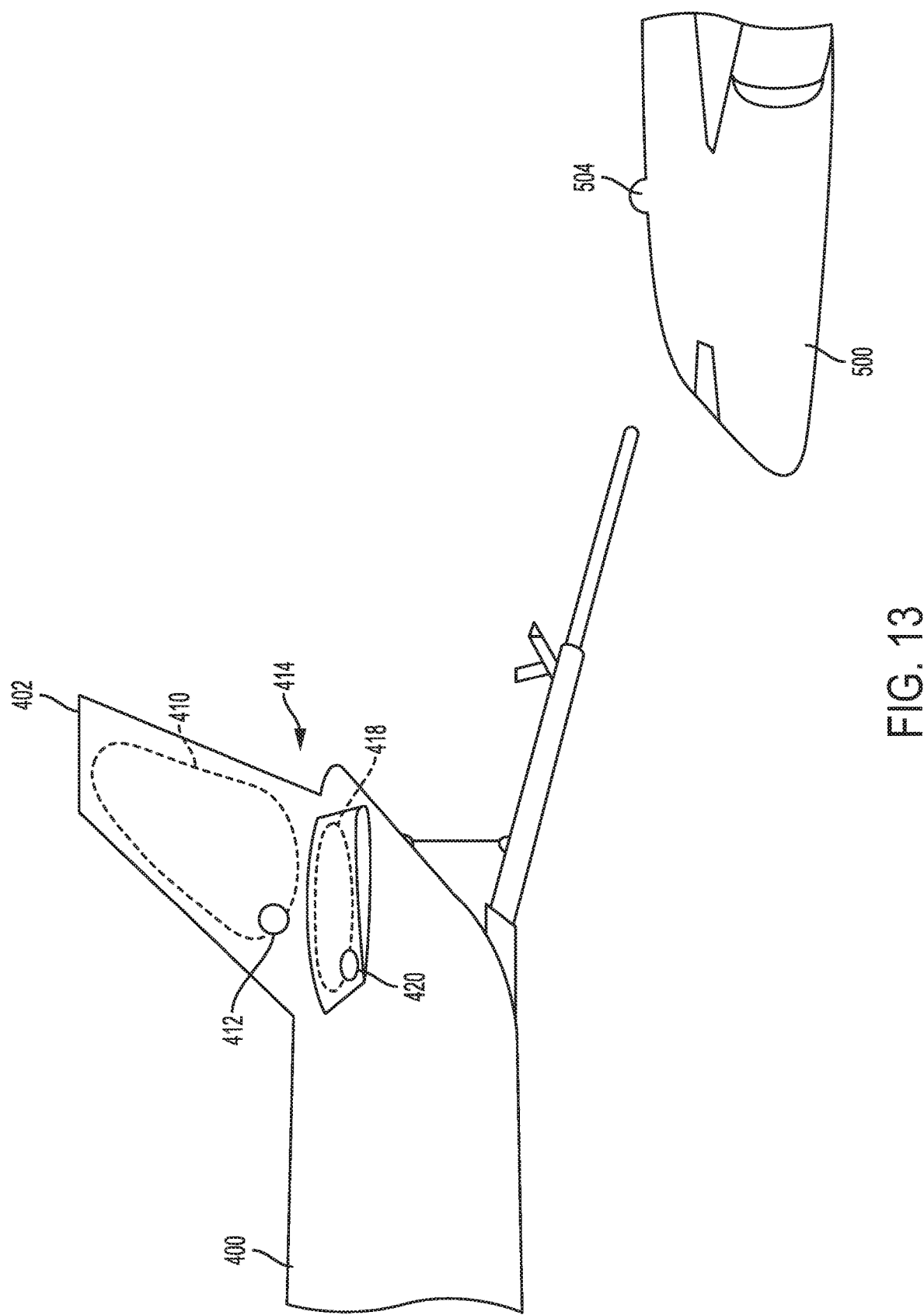
FIG. 13 is a simplified side view of an air vehicle and a tanker aircraft having a cooperative navigation system according to the present disclosure.

FIG. 13 shows a system for cooperative navigation used by a tanker aircraft 400 preparing to refuel another aircraft 500. The tanker includes a navigational reference, generally indicated at 414 supported by a flight surface 402, to generate a magnetic field. The navigational reference includes a conductive loop 410 embedded in a vertical stabilizer of tanker 400 and connected to an AC output generator 412, and a conductive loop 418 embedded in a horizontal stabilizer of tanker 400 and connected to an AC output generator 420. Navigational reference 414 may thereby generate a magnetic field with components having orthogonal AC magnetic polarization angles. In some examples AC output generators 412, 420 may have a phase difference resulting in a polarization ellipse.

A magnetometer 504 is attached to aircraft 500 to measure a surrounding magnetic field, including the field resulting from navigational reference 414. Estimates of relative location and orientation according to the measured magnetic field may allow aircraft 500 to correctly align with tanker 400 for refueling.

Figure 14:
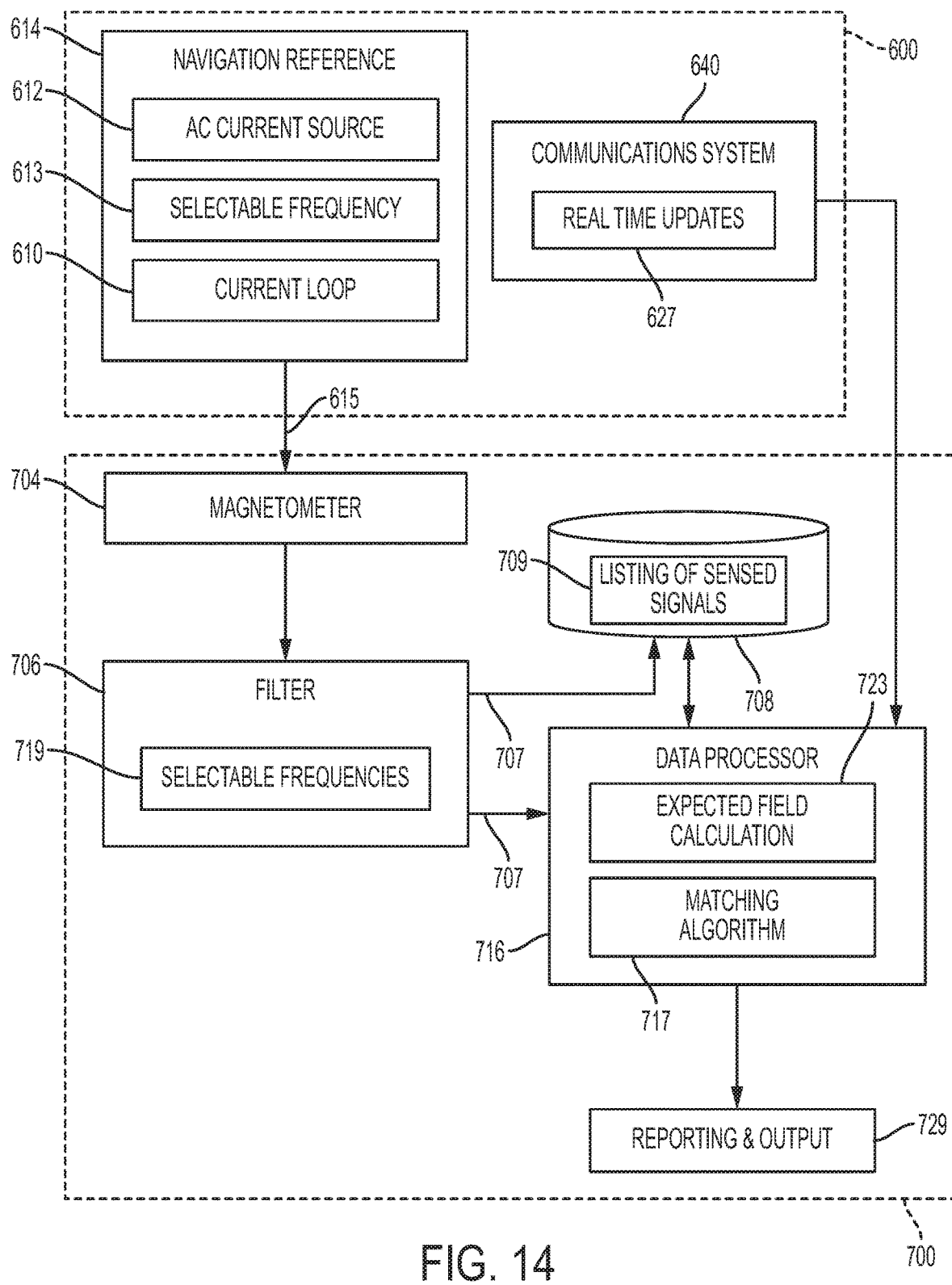
FIG. 14 is a schematic diagram depicting components of a cooperative system of vehicles.

A system for such cooperative navigation is shown as a schematic diagram in FIG. 14. A first vehicle 600 includes a navigation reference 614 having an AC current source 612. The AC current source has a selectable frequency 613, and navigation reference 614 generates a magnetic field 615.

A magnetometer 704 on a second vehicle 700 measures a surrounding magnetic field, and passes those measurements to a filter 706 to isolate components (e.g. signals) 707 corresponding to navigation reference 614. Filter 706 uses a Fourier transform to isolate one or more selectable frequencies 719, which may be selected to include frequency 613 of navigation reference 614. The isolated components are passed to a storage database 708 and a data processor 716. In database 708 the components are stored as a listing (e.g. of sensed signals) 709 as a function of time. In some examples filter 706 may be a function performed by data processor 716, and in some examples data processor 716 may select frequencies of filter 706.

Data processor 716 uses a mathematical model of magnetic field 615 and information provided regarding frequency, amperage or other attributes of navigation reference 614 to perform a calculation of expected magnetic field readings 723 at a variety of locations and orientations relative to the navigation reference. Using a matching algorithm 717 such as a Kalman filter or least squares fit, data processor 716 compares the isolated components 707 from filter 706 to determine an estimated location and orientation relative to vehicle 600. Reporting and output 729 of the estimates may be done to an operator or another system of vehicle 700.

Vehicle 600 further includes a communications system 640 configured to provide information or real time updates 627 to data processor 716 of vehicle 700. Communication between vehicles 600 and 700 may include radio contact between vehicle operators, wireless connection between navigational computers, or any other suitable manner of transmitting information.

Communications system 640 provides updates to information regarding attributes of navigation reference 614. An operator of vehicle 600 may select a new (e.g. selectable) frequency 613, may change the amperage of navigation reference 614, or alter other properties of the navigation reference during operation of vehicle 600. Communications system 640 may then update vehicle 700 regarding any change, so that data processor 716 may use the mathematical model of magnetic field 615 and the updated information to re-calculate expected magnetic field readings.

Figure 15:
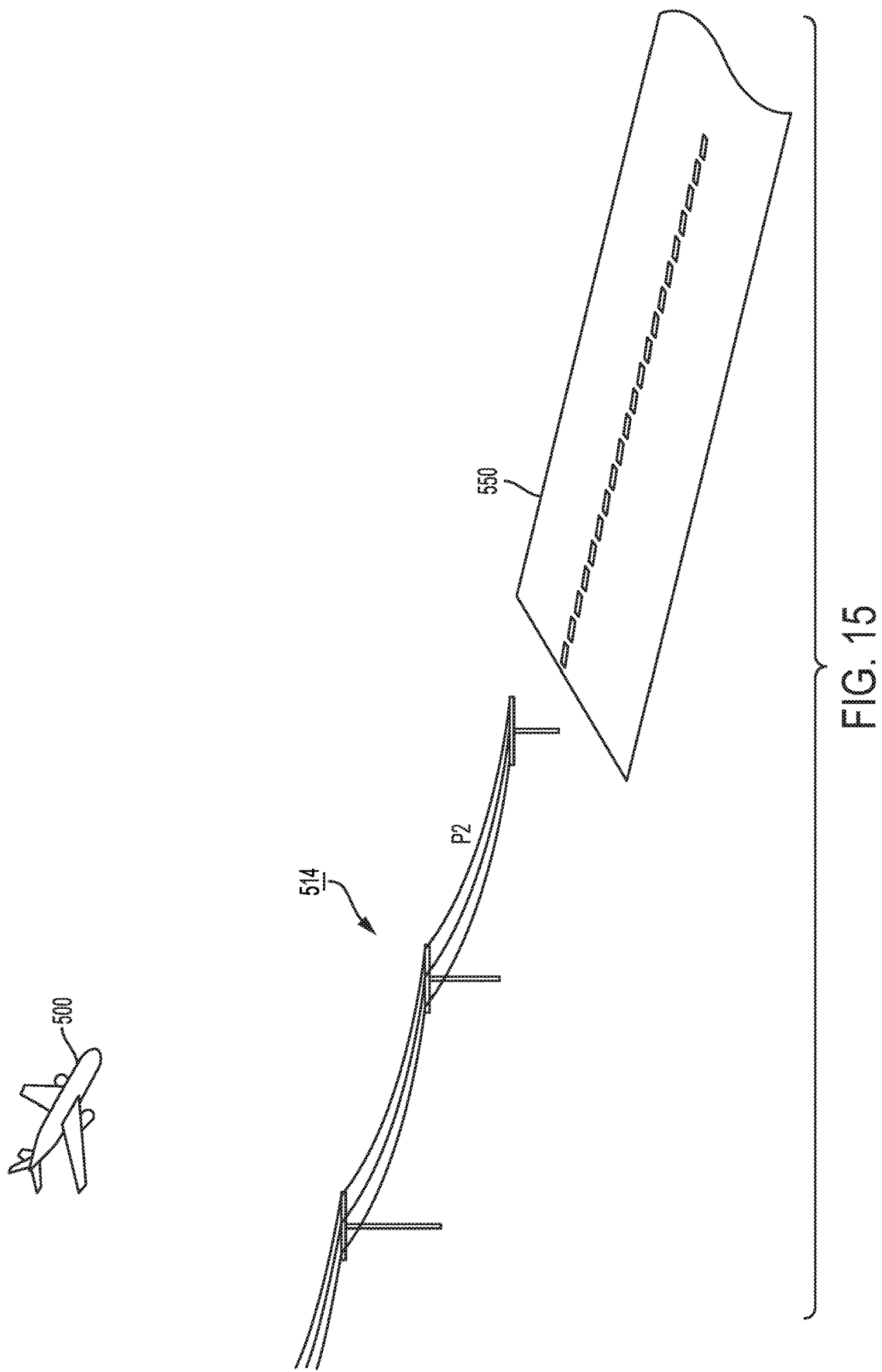
FIG. 15 is an aerial view of an air vehicle and a runway using a cooperative navigation system according to the present disclosure.

FIG. 15 shows another example of a system for cooperative navigation, used to assist landing of an aircraft 500 on a runway 550. In the pictured example, a navigational reference 514 includes one or more powerlines P2 installed at an approach end of runway 550. Powerlines P2 may include three conductors operating on three-phase power, as will be described in further detail below.

Powerlines P2 may be arranged similarly to, or incorporated with existing landing aids such as an approach lighting system of an airport runway. Aircraft 500 may be able to determine an estimated position relative to powerlines P2 and thereby correctly align for landing. Air traffic control for runway 550 may communicate information regarding navigational reference 514 to aircraft 500, to facilitate calculation of expected magnetic field readings and estimation of relative position.

In some examples a magnetometer of aircraft 500 may be configured to measure an attribute of a magnetic field generated by navigational reference 514 that is related to relative orientation between aircraft 500 and the navigational reference. For example, navigational reference 514 may generate a field with only vertical AC magnetic polarization angles, and the magnetometer of aircraft 500 may measure a magnitude of magnetic fields aligned with a vertical axis of the aircraft. Measured magnitude may then correspond to an extent to which aircraft 500 is oriented in a plane parallel to a plane defined by navigational reference 514. In such examples, navigational reference 514 may be used as an approach slope indicator to provide descent guidance information during landing approach.

Figure 16:
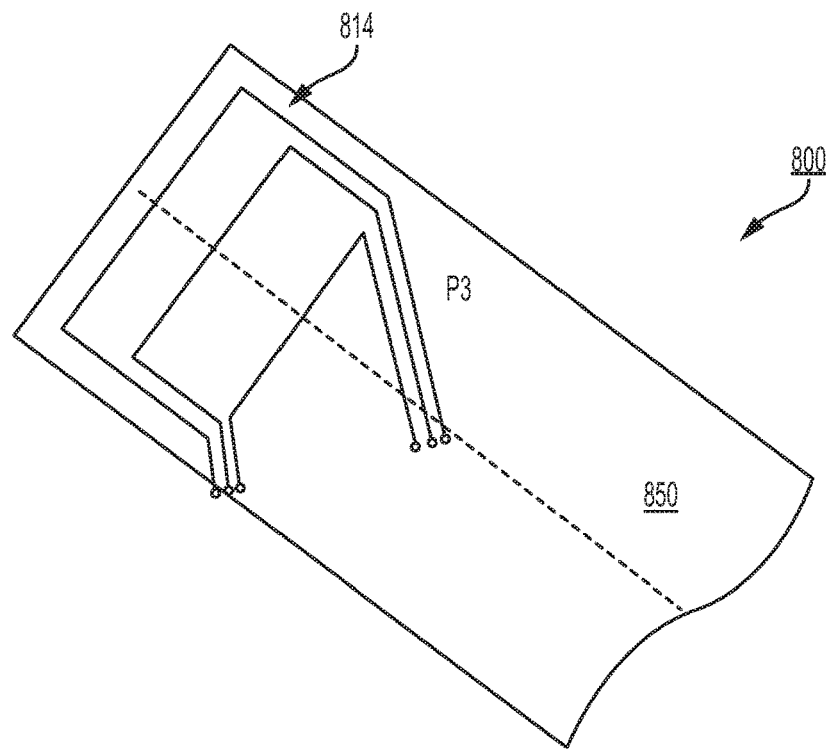
FIG. 16 is a top view of a first embodiment of a navigational reference integrated into an aircraft carrier runway.
Figure 17:
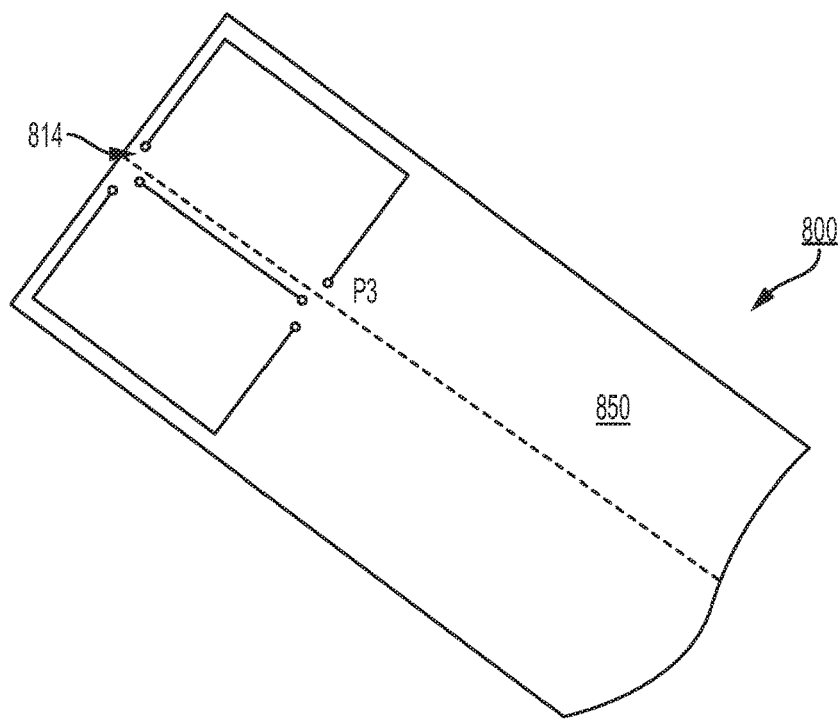
FIG. 17 is a top view of a second embodiment of a navigational reference integrated into an aircraft carrier runway.

FIGS. 16-17 show two examples of a navigational reference installed in a flight deck, or runway 850 of an aircraft carrier 800. In each, navigation reference 814 includes three powerlines P3 embedded in runway 850, at an approach end of the runway. Each powerline is generally rectangular in shape, matching a shape of the end of the runway, with one longest side parallel.

Powerlines P3 use three-phase power, each powerline having a phase offset 120-degrees from the others. Three-phase powerlines produce a magnetic field with continuously rotating orientation and varying intensity, analogous to the polarization ellipse of elliptically polarized light. An approaching aircraft may measure eccentricity of the polarization ellipse to yield precise estimates of position relative to a three-phase powerline.

Figure 18:
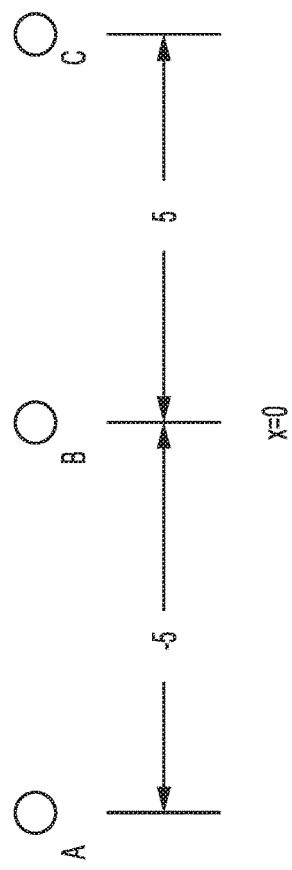
FIG. 18 is a cross-sectional view of a three phase powerline.
Figure 19C:
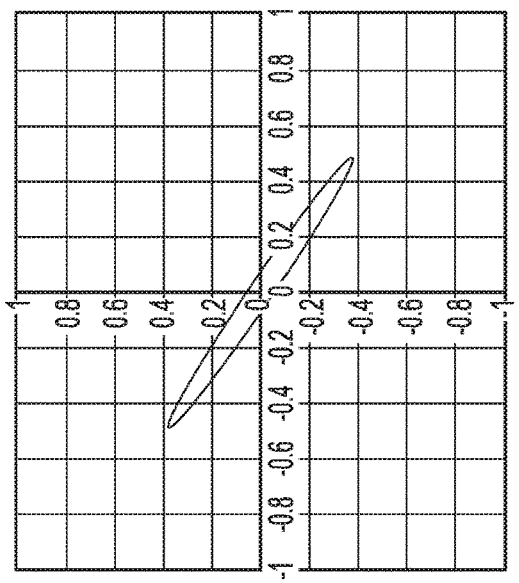
FIG. 19C shows a magnetic polarization ellipse due to the three phase powerline of FIG. 18, at a point x=6.
Figure 19B:
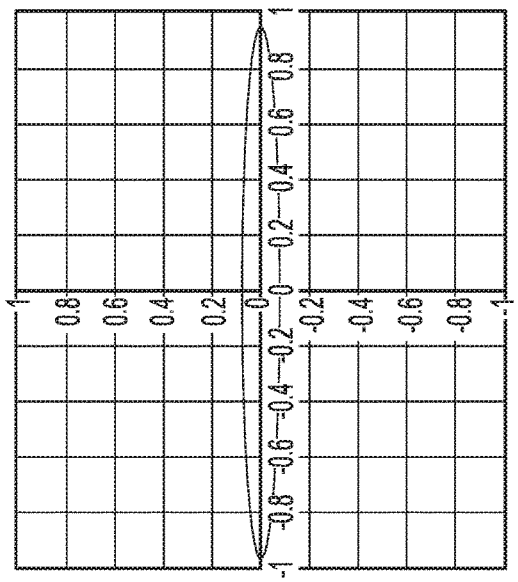
FIG. 19B shows a magnetic polarization ellipse due to the three phase powerline of FIG. 18, at a point x=5.15.
Figure 19A:
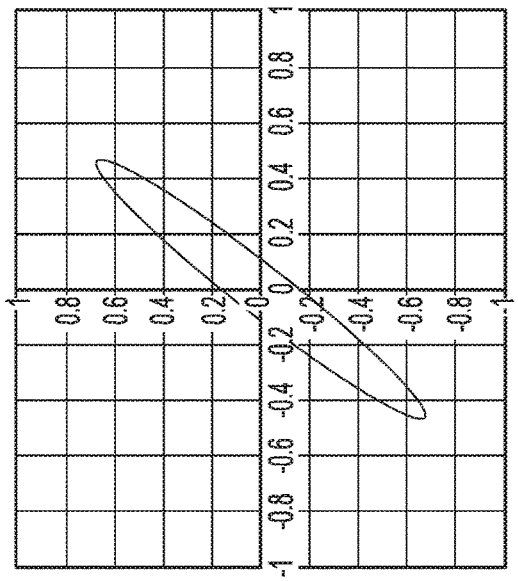
FIG. 19A shows a magnetic polarization ellipse due to the three phase powerline of FIG. 18, at a point x=4.

FIG. 18 is a schematic diagram of an idealized set of three powerlines carrying three-phase power. Conductors A, B, C are parallel to the y-axis and equally spaced along the x-axis by 5, with B passing through the origin. FIGS. 19A, 19B, and 19C are parametric plots of a combination of the magnetic fields resulting from all three powerlines over time, at three points a small distance from the x-axis. FIG. 19A shows the polarization ellipse at a point corresponding to x=4, FIG. 19B a point corresponding to x=5.15, and FIG. 19C a point corresponding to x=6. These plots show how a small difference in relative location to the three powerlines results in a significantly different reading, allowing the desired precise estimates of position.

Manner of Operation/Use

Figure 20:
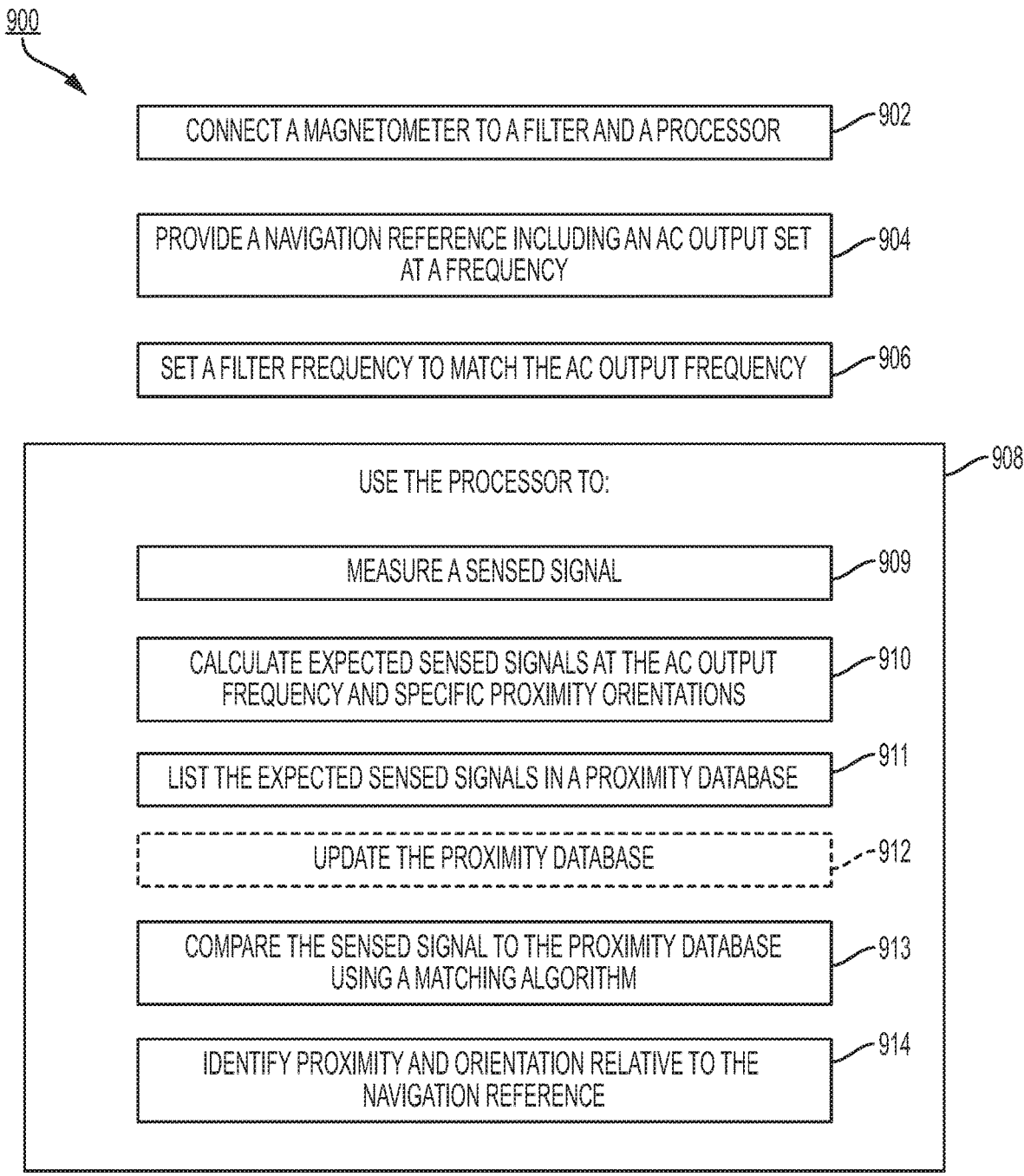
FIG. 20 is a diagrammatic representation of a flow chart illustrating a method for vehicle positioning.

FIG. 20 describes multiple steps of a method, generally indicated at 900, for vehicle positioning. Method 900 may be used in conjunction with any of the vehicles, navigational references, or cooperative systems of vehicles described in reference to FIGS. 1-19. Although various steps of method 900 are described below and depicted in FIG. 20, the steps need not necessarily all be performed, in some cases may be performed in a different order than the order shown, and in some cases may be performed simultaneously.

First step 902 of method 900 includes connecting a magnetometer to a filter and a processor. The magnetometer may be mounted on the flight surfaces of an air vehicle, while the filter and processor may be housed within the vehicle and integrated with further systems. The filter may be digital or analog, and in some examples may consist of a set of instructions executed by the processor.

Step 904 includes providing a navigation reference, which may be mounted on a second vehicle. The navigation reference includes a closed current loop connected to an alternating current output, which is set at an output frequency. The alternating current output may be powered by the second vehicle, and the output frequency may be selectable by a system or operator of the second vehicle.

Method 900 further includes step 906 of setting a filter frequency to match the output frequency. Setting the filter frequency may include altering physical components of an analog circuit filter, may include re-writing instructions to be executed by the processor, or may include any other effective method.

Step 908 of method 900 includes using the processor to perform substeps 909-914. First substep 909 includes measuring a sensed signal by applying the filter frequency to the filter. The sensed signal may correspond to a component or attribute of the alternating magnetic field generated by the navigation reference. For example, the sensed signal may include the magnetic polarization ellipse resulting from a navigation reference using three-phase power. For another example, the sensed signal may include the intensity of the alternating magnetic field along a vertical axis. Substep 909 may be repeated to measure additional sense signals corresponding to other components or attributes of the alternating magnetic field.

Substep 910 of step 908 includes calculating expected sensed signals at the output frequency and at specific proximity orientations. For example, the processor may employ a mathematical model of the alternating magnetic field generated by the navigation reference to calculate an expected magnetic polarization ellipse at specific distance and orientation relative to the navigation reference. In some embodiments, method 900 may include providing a database of expected sensed signals, which may be generated by taking measurements with the magnetometer at various proximity orientations relative to the navigation reference.

Substep 911 of step 908 includes listing the expected sensed signals in a proximity database, which may then form a reference database listing expected sensed signals. Optional substep 912 includes updating the proximity database, and may be performed multiple times at any point in the method. An update may be performed when a location estimate is made, when new information regarding the navigation reference is received, or at any point when a new listing of expected sensed signals may be advantageous.

Step 908 further includes substep 913, of comparing the sensed signal to the proximity database using a matching algorithm. The processor may use a least-squares fit, a Kalman filter, or any other appropriate matching algorithm to determine a closest matching expected sensed signal. In some examples, the processor may compare a listing of the sensed signal over time to the proximity database. In some examples, the processor may compare multiple sensed signals corresponding to multiple components or attributes of the measured magnetic field.

Substep 914 includes identifying proximity and orientation relative to the navigation reference. The closest matching expected sensed signal determined by the processor in substep 913 may be listed in the proximity database with an associated proximity and orientation, which may therefore be identified. In some examples, the processor may perform further calculation to identify proximity and orientation. For example, in a case where the sensed signal does not exactly match the expected sensed signal the processor employ a mathematical model to calculate a corrected proximity and orientation based on the variance between the sensed signal and the expected sensed signal.

ADDITIONAL EXAMPLES

This section describes additional aspects and features of examples, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A. A system for formation maneuvering comprising:
a first vehicle carrying at least one magnet that generates a first magnetic field external to the first vehicle;
a second vehicle including a magnetometer to measure a second magnetic field external to the magnetometer.

A1. The system of paragraph A wherein the at least one magnet is an electromagnet.

A2. The system of paragraph A1 wherein the electromagnet is connected to an AC output generator.

A3. The system of paragraph A1 wherein the electromagnet comprises a conductive loop formed as part of the vehicle surface.

A4. The system of paragraph A3 wherein the first vehicle is a first air vehicle and the vehicle surface is a flight surface.

A5. The system of paragraph A wherein the magnetometer comprises a conductive loop formed as part of the vehicle surface.

A6. The system of paragraph A5 wherein the second vehicle is a second air vehicle and the vehicle surface is a flight surface.

A7. The system of paragraph A wherein the second vehicle further comprises:
a database containing values of at least one attribute of the first magnetic field at a plurality of locations relative to the first vehicle, and
a processor to identify a location of the second vehicle relative to the first vehicle by comparing the second magnetic field sensed by the magnetometer to values of the at least one attribute of the first magnetic field at various locations relative to the first vehicle.

A8. The system of paragraph A7 wherein the at least one attribute of the first magnetic field is at least one of a frequency, a phase, an orientation, an ellipticity, a magnitude, a gradient.

A9. The system of paragraph A7 wherein the second vehicle further comprises a filter connected to the magnetometer and configured to isolate a sensed signal caused by the first magnetic field.

A10. The system of paragraph A wherein the second vehicle is an air vehicle comprising at least one rotor, wherein the magnetometer is mounted on the rotor; and further comprising:
a position sensor that senses a rotor position of the rotor relative to the vehicle, and
a processor operatively connected to the magnetometer and the position sensor.

A11. The system of paragraph A10 wherein the processor uses the position sensor to isolate a sensed magnetic field in multiple rotor positions so that a single magnetometer may act as a magnetic gradiometer when the rotor undergoes rotation.

A12. The system of paragraph A10 wherein a single-axis directional magnetometer is mounted on the rotor with its axis roughly 45-degrees from the direction of the rotor axis, and wherein the processor uses the position sensor to isolate a sensed signal in multiple rotor positions corresponding to multiple magnetometer orientations so that a single magnetometer may measure three-dimensional magnetic vectors when the rotor undergoes rotation.

B. An air vehicle comprising:
flight surfaces;
a magnetometer carried by the flight surfaces to measure a first magnetic field surrounding the magnetometer;
a filter carried by the flight surfaces to isolate a sensed signal caused by the first magnetic field;
a database carried by the flight surfaces containing a listing of the sensed signal as a function of time;
a conductive loop formed as part of the flight surfaces; and
an AC output generator connected to the conductive loop to generate a second magnetic field.

B1. The air vehicle of paragraph B, further comprising:
a rotor structurally connected to the flight surfaces;

a position sensor that senses a rotor position of the rotor relative to the flight surfaces; and
a processor operatively connected to the magnetometer, the filter, the database, and the position sensor;
wherein the magnetometer is mounted on the rotor; and
wherein the processor uses the filter and the position sensor to isolate a sensed signal in multiple rotor positions so that a single magnetometer may act as a magnetic gradiometer when the rotor undergoes rotation.

B2. The air vehicle of paragraph B, further comprising:
a second magnetometer carried by the flight surfaces, distal from the magnetometer; and
a processor operatively connected to the magnetometer, the second magnetometer, the filter, and the database;
wherein the processor uses the filter, the magnetometer, and the second magnetometer as a magnetic gradiometer.

B3. The air vehicle of paragraph B, wherein the magnetometer is mounted in a pod with non-conductive, non-ferromagnetic skin.

B4. The air vehicle of paragraph B, wherein:
the sensed signal corresponds to an AC frequency;
the magnetometer is mounted in a pod with a skin of a conductive material; and
the skin is thinner than half a calculated skin depth of the conductive material at the AC frequency.

B5. The air vehicle of paragraph B, wherein the filter has at least two modes, including:
an AC filter mode that isolates a sensed component of a magnetic field caused by a power line carrying alternating current; and
a DC filter mode that isolates a sensed component of the Earth's magnetic field.

B6. The air vehicle of paragraph B, wherein:
the conductive loop defines a first plane; and
the air vehicle further includes a second AC output generator connected to a second conductive loop that defines a second plane intersecting the first plane.

B7. The air vehicle of paragraph B6, wherein:
the conductive loop is embedded in a vertical stabilizer of the air vehicle; and
the second conductive loop is embedded in a horizontal stabilizer of the air vehicle.

B8. The air vehicle of paragraph B6, wherein:
the AC output generator has a first phase, and
the second AC output generator has a second phase that is different from the first phase.

B9. The air vehicle of paragraph B, further comprising:
a second AC output generator connected to a second conductive loop; and
a third AC output generator connected to a third conductive loop;
wherein:
the AC output generator has a first phase;
the second AC output generator has a second phase;
the third AC output generator has a third phase; and
the first phase, the second phase, and the third phase are all different.

B10. The air vehicle of paragraph B, wherein:
the AC output generator has an output frequency selected to be distinguishable from a localized electrical standard prevalent in a particular geographic region.

B11. The air vehicle of paragraph B, further comprising a processor to compare the sensed signal to a reference database listing expected sensed signals.

B12. The air vehicle of paragraph B11, wherein the reference database is updated during operation of the air vehicle.

B13. The air vehicle of paragraph B11, wherein the processor uses a matching algorithm.

B14. The air vehicle of paragraph B11, wherein the expected sensed signals are calculated by the processor.

B15. The air vehicle of paragraph B, wherein the filter isolates a selectable frequency.

B16. The air vehicle of paragraph B, further comprising a system that generates a third magnetic field surrounding the magnetometer, wherein the filter excludes signals corresponding to the third magnetic field.

C. A method of navigation, using the air vehicle of paragraph B and a second air vehicle according to paragraph B, comprising the steps of:
connecting the database of the first air vehicle to a processor;
measuring the second magnetic field of the second air vehicle with the magnetometer of the first air vehicle;
using the filter of the first air vehicle to isolate a sensed signal caused by the second magnetic field of the second air vehicle;
storing the sensed signal in the database of the first air vehicle as a function of time; and
using the processor analyze the database of the first air vehicle to identify proximity and orientation of the first air vehicle relative to the conductive loop of the second air vehicle.

C1. The method of navigation of paragraph C, wherein analyzing the database of the first air vehicle includes using a matching algorithm to compare the stored sensed signal to a reference database of expected sensed signals.

D. A cooperative system of vehicles, comprising:
a first vehicle;
a first magnetometer attached to the first vehicle to measure a first magnetic field surrounding the first magnetometer;
a first filter attached to the first vehicle to isolate a first sensed signal caused by the first magnetic field;
a first database attached to the first vehicle containing a listing of the first sensed signal as a function of time;
a first conductive loop attached to the first vehicle;
a first AC output generator connected to the first conductive loop to generate a second magnetic field;
a second vehicle;
a second magnetometer attached to the second vehicle to measure a third magnetic field surrounding the second magnetometer;
a second filter attached to the second vehicle to isolate a second sensed signal caused by the third magnetic field;
a second database attached to the second vehicle containing a listing of the second sensed signal as a function of time;
a second conductive loop attached to the second vehicle; and
a second AC output generator connected to the second conductive loop to generate a fourth magnetic field.

D1. The cooperative system of vehicles of paragraph D, wherein:
the first AC output generator has a first frequency; and
the second AC output generator has a second frequency that is different from the first frequency.

D2. The cooperative system of vehicles of paragraph D, wherein:
the first vehicle is a UAV and the second vehicle is a UAV; and
the first vehicle and the second vehicle are members of a UAV swarm.

D3. The cooperative system of vehicles of paragraph D, further comprising:
a rotor structurally connected to the first vehicle;
a position sensor that senses a rotor position of the rotor relative to the first vehicle; and a processor operatively connected to the first magnetometer, the first filter, the first database, and the position sensor;
wherein the first magnetometer is mounted on the rotor; and
wherein the processor uses the first filter and the position sensor to isolate a sensed signal in multiple rotor positions so that a single magnetometer may act as a magnetic gradiometer when the rotor undergoes rotation.

D4. The cooperative system of vehicles of paragraph D, further comprising:
a third magnetometer attached to the first vehicle, distal from the first magnetometer; and
a processor operatively connected to the first magnetometer, the third magnetometer, the first filter, and the first database;
wherein the processor uses the first filter, the first magnetometer, and the third magnetometer as a magnetic gradiometer.

D5. The cooperative system of vehicles of paragraph D, wherein the first magnetometer is mounted in a pod with non-conductive, non-ferromagnetic skin.

D6. The cooperative system of vehicles of paragraph D, wherein:
the first sensed signal corresponds to an AC frequency;
the first magnetometer is mounted in a pod with a skin of a conductive material; and
the skin is thinner than half a calculated skin depth of the conductive material at the AC frequency.

D7. The cooperative system of vehicles of paragraph D, wherein the first filter has at least two modes, including:
an AC filter mode that isolates a sensed component of a magnetic field caused by a power line carrying alternating current; and
a DC filter mode that isolates a sensed component of the Earth's magnetic field.

D8. The cooperative system of vehicles of paragraph D, wherein:
the first conductive loop defines a first plane; and
the first vehicle further includes a third AC output generator connected to a third conductive loop that defines a second plane intersecting the first plane.

D9. The cooperative system of vehicles of paragraph D8, wherein:
the first vehicle is an air vehicle;
the first conductive loop is embedded in a vertical stabilizer of the first vehicle; and
the third conductive loop is embedded in a horizontal stabilizer of the first vehicle.

D10. The cooperative system of vehicles of paragraph D8, wherein:
the first AC output generator has a first phase, and
the third AC output generator has a second phase that is different from the first phase.

D11. The cooperative system of vehicles of paragraph D, the first vehicle further comprising:
a third AC output generator connected to a third conductive loop; and
a fourth AC output generator connected to a fourth conductive loop;
wherein:
the first AC output generator has a first phase;
the third AC output generator has a second phase;
the fourth AC output generator has a third phase; and
the first phase, the second phase, and the third phase are all different.

D12. The cooperative system of vehicles of paragraph D, wherein:
the first AC output generator has an output frequency selected to be distinguishable from a localized electrical standard prevalent in a particular geographic region.

D13. The cooperative system of vehicles of paragraph D, the first vehicle further comprising:
a processor to compare the first sensed signal to a reference database listing expected sensed signals.

D14. The cooperative system of vehicles of paragraph D13, wherein the reference database is updated during operation of the first vehicle.

D15. The cooperative system of vehicles of paragraph D13, wherein the processor uses a matching algorithm.

D16. The cooperative system of vehicles of paragraph D13, wherein the expected sense signals are calculated by the processor.

D17. The cooperative system of vehicles of paragraph D, wherein the first filter isolates a selectable frequency.

D18. The cooperative system of vehicles of paragraph D, the first vehicle further comprising a system that generates a fifth magnetic field surrounding the first magnetometer, wherein the first filter excludes signals corresponding to the fifth magnetic field.

E. A system for cooperative navigation, comprising:
an air vehicle;
a magnetometer attached to the air vehicle to measure a magnetic field surrounding the magnetometer;
a filter attached to the air vehicle to isolate a sensed signal caused by the magnetic field;
a database attached to the air vehicle containing a listing of the sensed signal as a function of time; and
a navigation reference including a closed current loop connected to an alternating current output.

E1. The system for cooperative navigation of paragraph E, wherein the navigation reference is adjacent an airport runway.

E2. The system for cooperative navigation of paragraph E, wherein the navigation reference is embedded in an aircraft carrier.

E3. The system for cooperative navigation of paragraph E, wherein the navigation reference is embedded in a second vehicle.

E4. The system for cooperative navigation of paragraph E, further comprising:
a second closed current loop;
wherein the closed current loop defines a first navigation reference plane; and
wherein the second closed current loop defines a second navigation reference plane oriented to intersect the first navigation reference plane.

E5. The system for cooperative navigation of paragraph E4, wherein:
the closed current loop is embedded in a vertical stabilizer of an airplane; and
the second closed current loop is embedded in a horizontal stabilizer of an airplane.

F. A method of navigation, using the system for cooperative navigation of paragraph E, comprising the steps of:
connecting the database of the air vehicle to a processor;
measuring a magnetic field generated by the navigation reference with the magnetometer;
using the filter to isolate a sensed signal caused by the magnetic field;
storing the sensed signal in the database as a function of time; and
using the processor to analyze the database to identify proximity and orientation of the air vehicle relative to the navigation reference.

F1. The method of navigation of paragraph F, wherein analyzing the database includes using a matching algorithm to compare the stored sensed signal to a reference database of expected sensed signals.

G. A method for vehicle navigation, comprising the steps of:
connecting a magnetometer to a filter and a processor;
setting a first filter frequency to match a first expected frequency selected to match a frequency of existing power lines supplying power to a geographic region;
providing a navigation reference including a closed current loop connected to an alternating current output, with the alternating current output set at an output frequency that is at least five percent different from the first expected frequency;
setting a second filter frequency to match the output frequency;
using the processor to measure a first sensed signal by applying the first filter frequency to the filter;
using the processor to identify a location by comparing the first sensed signal to a geographic database listing expected sensed signals at the first expected frequency at specific locations;
using the processor to measure a second sensed signal by applying the second filter frequency to the filter; and
using the processor to identify proximity and orientation relative to the navigation reference by comparing the second sensed signal to a proximity database listing expected sensed signals at the output frequency at specific proximity orientations.

G1. The method of paragraph G, wherein:
comparing the first sensed signal to a geographic database includes using a matching algorithm; and
comparing the second sensed signal to a proximity database includes using a matching algorithm.

G2. The method of paragraph G, wherein the expected sensed signals are calculated by the processor.

G3. The method of paragraph G, further comprising a step of:
updating the geographic database and the proximity database.

G4. The method of paragraph G, wherein the navigation reference is mounted on a vehicle.

G5. The method of paragraph G, further comprising the steps of:
setting a DC filter mode; and
using the processor to measure a third sensed signal corresponding to the Earth's magnetic field.

G6. The method of paragraph G, wherein the navigation reference uses three phase power.

G7. The method of paragraph G, further comprising the step of:
connecting a second magnetometer;
wherein the processor uses the filter, the magnetometer, and the second magnetometer as a magnetic gradiometer.

H. A method for vehicle positioning, comprising the steps of:
connecting a magnetometer to a filter and a processor;
providing a navigation reference including a closed current loop connected to an alternating current output, with the alternating current output set at an output frequency;
setting a filter frequency to match the output frequency;
using the processor to measure a sensed signal by applying the filter frequency to the filter; and
using the processor to identify proximity and orientation relative to the navigation reference by comparing the sensed signal to a proximity database listing expected sensed signals at the output frequency at specific proximity orientations.

H1. The method of paragraph H, wherein:
comparing the sensed signal to a proximity database includes using a matching algorithm.

H2. The method of paragraph H, wherein the expected sensed signals are calculated by the processor.

H3. The method of paragraph H, wherein the navigation reference is mounted on a vehicle.

H4. The method of paragraph H, further comprising a step of updating the proximity database.

H5. The method of paragraph H, wherein the navigation reference uses three phase power.

H6. The method of paragraph H, further comprising the step of:
connecting a second magnetometer;
wherein the processor uses the filter, the magnetometer, and the second magnetometer as a magnetic gradiometer.

Advantages, Features, Benefits

The different embodiments of the cooperative system of vehicles described herein provide several advantages over known solutions for navigation and positioning. For example, the illustrative embodiments of cooperative vehicles described herein allow precise determination of relative distance and orientation. Additionally, and among other benefits, illustrative embodiments of the cooperative vehicles described herein allow a navigation in the absence of GPS. No known system or device can perform these functions, particularly in zero-visibility situations. Thus, the illustrative embodiments described herein are particularly useful for UAV swarms, formation flying, and low visibility landings. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

We claim:

1. A cooperative system of vehicles, comprising:
a first vehicle;
a first magnetometer attached to the first vehicle;
a first navigational reference attached to the first vehicle, including a first conductive loop and a first AC output generator connected to the first conductive loop to generate a first magnetic field;
a second vehicle;
a second magnetometer attached to the second vehicle; and
a second navigational reference attached to the second vehicle, including a second conductive loop and a second AC output generator connected to the second conductive loop to generate a second magnetic field;
wherein the first vehicle includes a first filter configured to isolate a first sensed signal caused by the second magnetic field and measured by the first magnetometer, and the second vehicle includes a second filter configured to isolate a second sensed signal caused by the first magnetic field and measured by the second magnetometer; and
wherein the first vehicle includes a processor configured to determine an estimated position of the first vehicle relative to the second vehicle based on the first sensed signal.

2. The cooperative system of vehicles of claim 1, wherein:
the first AC output generator has a first frequency; and
the second AC output generator has a second frequency that is different from the first frequency.

3. The cooperative system of vehicles of claim 1, wherein:
the first vehicle is a UAV and the second vehicle is a UAV; and
the first vehicle and the second vehicle are members of a UAV swarm.

4. The cooperative system of vehicles of claim 1, further comprising:
a rotor structurally connected to the first vehicle; and
a position sensor that senses a rotor position of the rotor relative to the first vehicle;
wherein the processor is operatively connected to the first magnetometer, the first filter, and the position sensor;
wherein the first magnetometer is mounted on the rotor; and
wherein the processor uses the first filter and the position sensor to isolate a sensed signal in multiple rotor positions so that a single magnetometer may act as a magnetic gradiometer when the rotor undergoes rotation.

5. The cooperative system of vehicles of claim 1, wherein the first magnetometer is mounted in a pod with non-conductive, non-ferromagnetic skin.

6. The cooperative system of vehicles of claim 1, wherein:
the first sensed signal corresponds to an AC frequency;
the first magnetometer is mounted in a pod with a skin of a conductive material; and
the skin is thinner than half a calculated skin depth of the conductive material at the AC frequency.

7. The cooperative system of vehicles of claim 1, wherein:
The first AC output generator has an output frequency selected to be distinguishable from a localized electrical standard prevalent in a particular geographic region.

8. The cooperative system of vehicles of claim 1, wherein:
the processor compares the first sensed signal to a reference database listing expected sensed signals.

9. The cooperative system of vehicles of claim 8, wherein the processor uses a matching algorithm.

10. The cooperative system of vehicles of claim 1, wherein the first vehicle further includes a geographic database listing expected sensed signals at specific locations.

11. A system for cooperative navigation, comprising:
a navigation reference including a closed current loop connected to an alternating current output having a selected output frequency, and configured to generate a magnetic field;
an air vehicle;
a magnetometer attached to the air vehicle;
a filter attached to the air vehicle to isolate a sensed signal caused by the magnetic field and measured by the magnetometer; and
a database attached to the air vehicle containing a listing of the sensed signal as a function of time;
wherein the air vehicle includes a processor configured to determine an estimated position of the air vehicle relative to the navigation reference based on the sensed signal.

12. The system for cooperative navigation of claim 11, wherein the navigation reference is adjacent an airport runway.

13. The system for cooperative navigation of claim 11, wherein the navigation reference is embedded in an aircraft carrier.

14. The system for cooperative navigation of claim 11, wherein the navigation reference is embedded in a second vehicle.

15. A method for an aerial vehicle positioning, comprising the steps of:
connecting a magnetometer to a filter and a processor, wherein the magnetometer, filter, and processor are attached to a vehicle;
providing a navigation reference including a closed current loop connected to an alternating current output having a selected output frequency, and configured to generate a magnetic field;
setting a filter frequency to match the output frequency;
using the processor to isolate a sensed signal caused by the magnetic field and measured by the magnetometer, by applying the filter frequency to the filter; and
using the processor to identify proximity and orientation of the vehicle relative to the navigation reference by comparing a listing of the sensed signal as a function of time to a proximity database listing expected sensed signals at the output frequency at specific proximity orientations.

16. The method of claim 15, wherein:
comparing the sensed signal to a proximity database includes using a matching algorithm.

17. The method of claim 15, wherein the expected sensed signals are calculated by the processor.

18. The method of claim 15, wherein the navigation reference is mounted on another vehicle.

19. The method of claim 15, further comprising a step of updating the proximity database.

20. The method of claim 15, wherein the navigation reference uses three phase power.

* * * * *